United States Patent
Minezawa

(10) Patent No.: US 10,750,549 B2
(45) Date of Patent: Aug. 18, 2020

(54) COMMUNICATION SYSTEM AND METHOD OF CONTROLLING COMMUNICATION SYSTEM

(71) Applicant: Mitsubishi Electric Corporation, Tokyo (JP)

(72) Inventor: Satoshi Minezawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/084,315

(22) PCT Filed: May 30, 2016

(86) PCT No.: PCT/JP2016/065906
§ 371 (c)(1),
(2) Date: Sep. 12, 2018

(87) PCT Pub. No.: WO2017/208299
PCT Pub. Date: Dec. 7, 2017

(65) Prior Publication Data
US 2019/0082479 A1   Mar. 14, 2019

(51) Int. Cl.
H04W 76/10  (2018.01)
H04W 84/18  (2009.01)
H04W 88/04  (2009.01)
H04W 12/06  (2009.01)

(52) U.S. Cl.
CPC .......... *H04W 76/10* (2018.02); *H04W 12/06* (2013.01); *H04W 84/18* (2013.01); *H04W 88/04* (2013.01)

(58) Field of Classification Search
CPC .................................................... H04W 76/12

USPC ......................................................... 370/329
See application file for complete search history.

(56) References Cited

U.S. PATENT DOCUMENTS

| 2009/0052667 | A1  | 2/2009 | Iwamura |
| 2009/0135815 | A1* | 5/2009 | Pacella .................. H04L 45/04 370/389 |
| 2013/0039287 | A1* | 2/2013 | Rayavarapu .......... H04W 76/28 370/329 |

(Continued)

FOREIGN PATENT DOCUMENTS

| JP | 2002-073565 A | 3/2002 |
| JP | 2003-318914 A | 11/2003 |
| JP | 2006-339806 A | 12/2006 |

(Continued)

OTHER PUBLICATIONS

Extended EP Search Report dated Feb. 11, 2019 issued in corresponding EP patent application No. 16903927.8.

(Continued)

*Primary Examiner* — Peter G Solinsky
(74) *Attorney, Agent, or Firm* — Posz Law Group, PLC

(57) ABSTRACT

A controller and a plurality of client apparatuses form a wireless home network. Predetermined setting information necessary for each client apparatus to communicate with the controller is input to each client apparatus, for example, through a path via a remote controller in a manner of communication different from a manner of communication of the wireless home network. Each client apparatus has the input setting information retained in an internal memory to automatically connect to the wireless home network later.

14 Claims, 19 Drawing Sheets

(56) References Cited

U.S. PATENT DOCUMENTS

2015/0106184 A1    4/2015  Tanaka et al.
2016/0309408 A1*  10/2016  Dangy-Caye ......... H04W 76/28

FOREIGN PATENT DOCUMENTS

| JP | 2007-049522 A | 2/2007 |
|---|---|---|
| JP | 2010-537560 A | 12/2010 |
| JP | 2013-161250 A | 8/2013 |
| JP | 2013-247400 A | 12/2013 |
| JP | 2014-127729 A | 7/2014 |
| JP | 2014-236326 A | 12/2014 |
| JP | 2015-226178 A | 12/2015 |
| JP | 2016-052023 A | 4/2016 |
| WO | 2013/157377 A1 | 10/2013 |
| WO | 2014/005939 A1 | 1/2014 |
| WO | 2014/103314 A1 | 7/2014 |

OTHER PUBLICATIONS

International Search Report of the International Searching Authority dated Aug. 16, 2016 for the corresponding International application No. PCT/JP2016/065906 (and English translation).
Office Action dated Aug. 20, 2019 issued in corresponding JP patent application No. 2018-520067 (and English translation).
Office Action dated Feb. 5, 2020 issued in corresponding EP patent application No. 16903927.8.
Office Action dated Mar. 10, 2020 issued in corresponding JP patent application No. 2018-520067 (and English translation).

* cited by examiner

FIG.28

| APPLICATION | LED1<br>READY | LED2<br>COMMUNICATION STATE | LED3<br>CONNECTION SETUP STATE | LED4<br>ERROR STATE |
|---|---|---|---|---|
| ON<br>FLASH | CONNECTION SETUP ENABLED (GREEN ON) | COMMUNICATION IN PROGRESS (GREEN FLASH) | SETUP IN PROGRESS (GREEN FLASH)<br>SETUP ESTABLISHED (GREEN ON) | ERROR<br>(RED ON) |
| OFF | CONNECTION SETUP DISABLED | COMMUNICATION NOT IN PROGRESS | NOT SET | NO ERROR |
| LED1~4<br>ALL ON | RESET PROCESSING | | | |

COMMUNICATION SYSTEM AND METHOD OF CONTROLLING COMMUNICATION SYSTEM

CROSS REFERENCE TO RELATED APPLICATION

This application is a U.S. national stage application of International Application No. PCT/JP2016/065906, filed on May 30, 2016, the contents of which are incorporated herein by reference.

TECHNICAL FIELD

The present invention relates to a connection setup process for a wireless communication network.

BACKGROUND

For example, Japanese Patent Laying-Open No. 2003-318914 (PTD 1) and Japanese Patent Laying-Open No. 2013-161250 (PTD 2) describe a wireless communication network in which a plurality of client apparatuses are connected to one server. To form such a wireless communication network, connection setup need to be performed between the server and each client apparatus in initial connection for, for example, security setting including mutual authentication.

Japanese Patent Laying-Open No. 2014-236326 (PTD 3) describes a device server connection setup method using WPS (Wi-Fi-Protected Setup: registered trademark) as a manner of the connection setup as described above. Specifically, a switch for use in the WPS push button method is used in common, and when the switch is pushed, connection setup of a peripheral device to a device server is started in addition to WPS. Specifically, in response to operation on a first switch (button) and a second switch (button) on the client side and the device server, a connection standby state for accepting connection setup is formed for a predetermined time, and when connection setup is established within the predetermined time, a client apparatus newly set through exchange of predetermined information is allowed to use a peripheral device connected to the device server.

PATENT LITERATURE

PTD 1: Japanese Patent Laying-Open No. 2003-318914
PTD 2: Japanese Patent Laying-Open No. 2013-161250
PTD 3: Japanese Patent Laying-Open No. 2014-236326

In the initial setup of a wireless communication network in which a plurality of client apparatuses are connected to one server as described in PTDs 1 and 2, the operation of successively performing connection setup between the server and each client apparatus is required. In doing so, information necessary for connection setup is generally transmitted/received through communication between the server and a client apparatus connected thereto, as in the WPS push button method described in PTD 3.

However, with such connection setup, information is not transmitted from the server to the client apparatus unless communication between the client apparatus and the server is established. In order to connect a plurality of client apparatuses to the wireless network, connection setup is not completed unless communication is established normally between all the client apparatuses and the server. This may increase the operation time.

SUMMARY

The present invention is made in order to solve the problem above, and an object of the present invention is to reduce operation load and operation time for connection setup in a wireless communication network to which a plurality of client apparatuses are connected.

A communication system according to the present invention includes: a plurality of client apparatuses; a communication control apparatus configured to form a wireless network with the plurality of client apparatuses; and an input device. The communication control apparatus includes a first communication unit configured to wirelessly communicate with each of the plurality of client apparatuses. Each of the plurality of client apparatuses includes a second communication unit, a third communication unit, a first memory unit, and a communication control unit. The second communication unit is configured to wirelessly communicate with the first communication unit. The third communication unit is configured to communicate with an apparatus external to the client apparatus in a manner of communication different from a manner of communication of the first and second communication units. The first memory unit is configured to store setting information necessary for each client apparatus to communicate with the communication control apparatus by forming the wireless network. The input device is configured to input the setting information to each of the plurality of client apparatuses through a path different from a communication path between the first and second communication units. The communication control unit is configured to write, into the first memory unit, the setting information received from the input device by the third communication unit.

Another aspect of the present invention provides a method of controlling a communication system. The communication system includes a plurality of client apparatuses and a communication control apparatus configured to form a wireless network with the plurality of client apparatuses. The communication control apparatus includes a first communication unit configured to wirelessly communicate with each of the plurality of client apparatuses. Each of the plurality of client apparatuses includes a second communication unit, a third communication unit, and a memory unit. The second communication unit is configured to wirelessly communicate with the first communication unit. The third communication unit is configured to communicate with an apparatus external to the client apparatus in a manner of communication different from a manner of communication of the first and second communication units. The memory unit is configured to store setting information necessary for each client apparatus to communicate with the communication control apparatus by forming the wireless network. The method includes the steps of: inputting the setting information to each of the plurality of client apparatuses through a path different from a communication path between the first and second communication units; and writing the setting information received by the third communication unit via the path into the memory unit, in each of the plurality of client apparatuses.

The present invention can reduce operation load and operation time for connection setup in a wireless communication network to which a plurality of client apparatuses are connected.

BRIEF DESCRIPTION OF DRAWINGS

FIG. 28 is a diagram illustrating an example of LED display for connection setup according to a fourth embodiment.

DETAILED DESCRIPTION

Embodiments of the present invention will be described in detail below with reference to the figures. In the following, the same or corresponding parts in the figures are denoted by the same reference signs and a description thereof is basically not repeated. Although a plurality of embodiments and modifications thereof are described below, it is initially intended that the configurations or controls described in the embodiments or modifications are combined where appropriate.

First Embodiment

Figure 1:
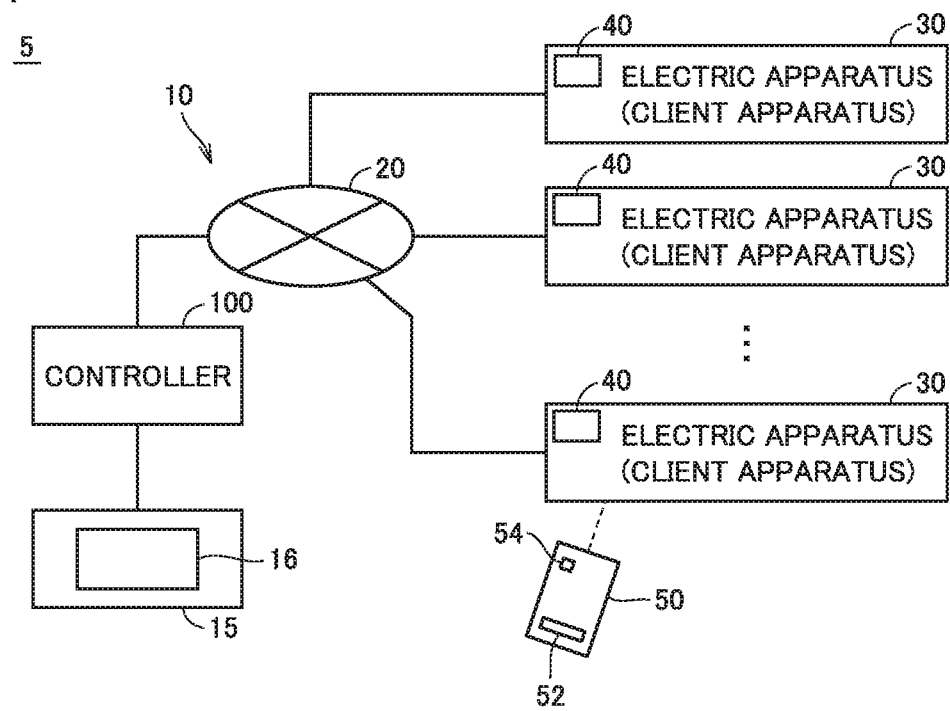
FIG. 1 is a block diagram illustrating an overall configuration of an energy management system which is an application example of a communication system according to a first embodiment of the present invention.

FIG. 1 is a block diagram illustrating an overall configuration of an energy management system which is an application example of a communication system according to a first embodiment of the present invention.

Referring to FIG. 1, an energy management system 5 is an HEMS (Home Energy Management System) having functions such as energy management and device cooperation to integrate a plurality of electric apparatuses 30 at home. Energy management system 5 includes a communication system 10 formed between a plurality of electric apparatuses 30 and a controller 100. Data and/or signals for implementing the functions such as energy management and device cooperation are exchanged between each electric apparatus 30 and controller 100 through communication system 10.

In communication system 10, controller 100 and each electric apparatus 30 can be connected to a wireless home network 20 to communicate with each other. In the present embodiment, communication system 10 is configured with wireless home network 20 including controller 100 serving as "server" and a plurality of electric apparatuses 30 each serving as "client apparatus". Wireless home network 20 is a network for communication in accordance with a variety of communication protocols, such as Wi-Fi (registered trademark), Bluetooth (registered trademark), Zig-Bee (registered trademark), ECHONET Lite (registered trademark), Wi-SUN (registered trademark), and specified low power radio (900 MHz, 400 MHz). That is, controller 100 and each electric apparatus 30 can transmit/receive signals in accordance with this communication protocol to communicate each other via wireless home network 20.

A plurality of electric apparatuses 30 include home appliances such as air conditioner, refrigerator, television receiver, electric water heater, electromagnetic cooker, and fans, and are distributed as appropriate at home. Each electric apparatus 30 contains a communication adaptor 40 to connect to wireless home network 20. Wireless home network 20 is illustrated as an embodiment of "wireless communication network". That is, in the present invention, "wireless communication network" means the one formed in a relatively short distance, such as home. In the following, in the present embodiment, communication via wireless home network 20 is performed through wireless LAN (Local Area Network) connection compliant with the Wi-Fi (registered trademark) standards. That is, controller 100 and communication adaptor 40 (electric apparatus 30) include interfaces for wireless LAN connection.

In the present description, each electric apparatus 30 contains communication adaptor 40. However, communication adaptor 40 may be attached as a separate device to electric apparatus 30. In any case, each electric apparatus 30 can exchange information with controller 100 through transmission/reception of data and/or signals using communication adaptor 40.

Controller 100 is an HEMS controller centrally controlling a plurality of electric apparatuses 30 and corresponds to an embodiment of "communication control apparatus". Controller 100 may function as a home gateway server between wireless home network 20 and a not-shown wide area network (for example, the internal formed external to HEMS. This allows controller 100 to communicate with an external server.

Controller 100 is connected to an operation terminal 15 through wireless communication or wired communication. Operation terminal 15 is typically fixed on a wall of a house or configured with a remote controller. Operation terminal 15 is provided with a display unit 16 for displaying information that can be visually recognized by a user. Display unit 16 is typically configured with a liquid crystal touch panel screen. Operation terminal 15 may be configured with a tablet terminal. Alternatively, operation terminal 15 and controller 100 may be integrated.

The user can input an operation command to controller 100 using operation terminal 15. For example, soft switches on the touch panel screen or hard switches provided independent of display unit 16 are used to input an operation command. Controller 100 thus can display data related to energy management using display unit 16 in accordance with an operation command input by the user. This display data is created using data and/or a signal transmitted from each electric apparatus 30 via wireless home network 20.

Alternatively, controller 100 can output an operation command (for example, command for start/stop operation or operation in energy-saving mode) to each electric apparatus 30 in accordance with the operation command input by the user. The operation command is transmitted from controller 100 to each electric apparatus 30 via wireless home network 20.

Wireless home network 20 is formed under an environment with various radio waves. Therefore connection setup for mutual authentication is necessary so that data communication is performed only between apparatuses with ensured security. Once connection setup for each electric apparatus 30 (client apparatus) with controller 100 is completed, subsequent connection to wireless home network 20 is automatically enabled.

Figure 2:
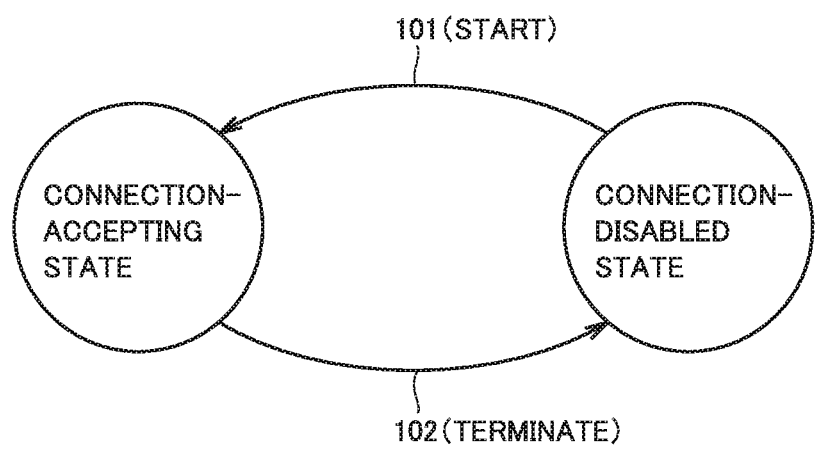
FIG. 2 is a state transition diagram illustrating a general connection setup process to a wireless home network.

First referring to FIG. 2 and FIG. 3, a general connection setup process to a wireless home network will be described. FIG. 2 is a state transition diagram related to a connection setup process of controller 100 shown in FIG. 1.

Referring to FIG. 2, controller 100 is in a connection-disabled state by default and, when a startup condition 101 is established, makes a transition from a connection-disabled state to a connection-accepting state. For example, in the WPS push button method, startup condition 101 is established when user operation on a predetermined button is detected.

Figure 3:
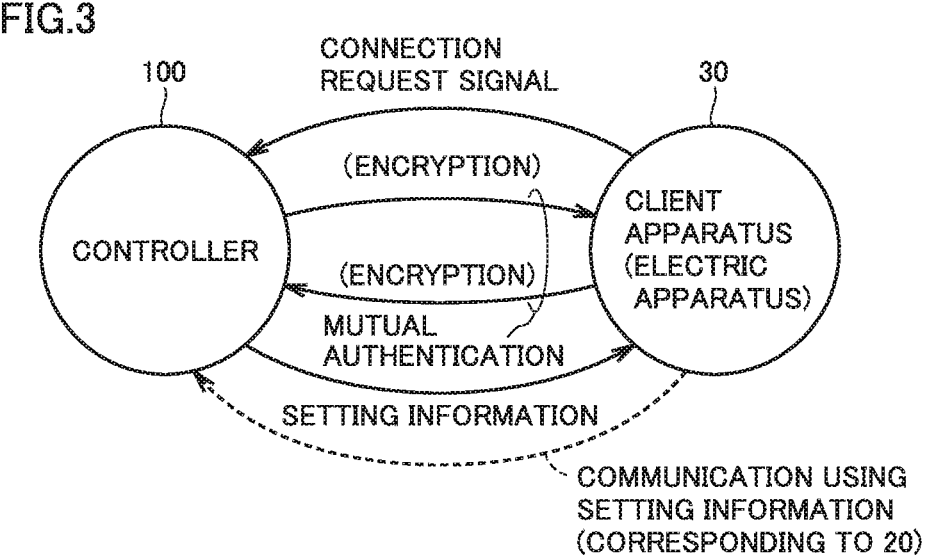
FIG. 3 is a conceptual diagram illustrating the procedure of the connection setup process in FIG. 2.

FIG. 3 is a conceptual diagram showing the procedure of the connection setup process in FIG. 2.

Referring to FIG. 3, when receiving a request signal for connection setup from a client apparatus (electric apparatus 30) in the connection-accepting state (FIG. 2), controller 100 executes a connection setup process for the client apparatus. For example, the request signal is output when a predetermined button is operated by the user on the client apparatus side.

Further, information (preferably, encrypted information) is transmitted/received between controller 100 and electric apparatus 30 (client apparatus) outputting a connection setup request, through wireless communication in accordance with a communication protocol common to wireless home network 20 to perform mutual authentication, and predetermined setting information for communicating with controller 100 is output to the client apparatus. The setting information is then stored into the client apparatus to establish connection setup.

Electric apparatus 30 (client apparatus) with connection setup established automatically connects to wireless home network 20 in next and subsequent communication to transmit/receive data to/from controller 100 or another client apparatus (electric apparatus 30).

Referring to FIG. 2 again, when a predetermined termination condition 102 is established, controller 100 makes a transition from a connection-accepting state to a connection-disabled state. In general, termination condition 102 is established when connection setup is established with any client apparatus after starting of a connection-accepting state or when a predetermined timeout (for example, about two minutes) elapses without establishing connection setup with any of client apparatuses.

In a connection-disabled state, controller 100 does not accept a request for connection setup from each client apparatus (electric apparatus 30). Therefore, in a connection-disabled state, connection setup is not executed even when a connection request signal is output from a client apparatus. In this way, the connection setup started in response to user operation can reduce the possibility that an unintended client apparatus is connected to wireless home network 20 under an environment with various radio waves.

However, to complete the connection setup described in FIG. 2, wireless communication should be established in accordance with a communication protocol common to wireless home network 20, between controller 100 and each client apparatus (electric apparatus 30). Therefore, when a communication failure prevents a client apparatus from establishing connection setup, an operation such as changing the position of controller 100 and/or the client apparatus (electric apparatus 30) is necessary for improving the radio wave condition. In addition, user operation is necessary on both the controller 100 side and the client apparatus (electric apparatus 30) side every time connection setup is done for each client apparatus (electric apparatus 30). For these reasons, the operation may require longer time to complete the connection setup for all of a plurality of client apparatuses.

Figure 4:
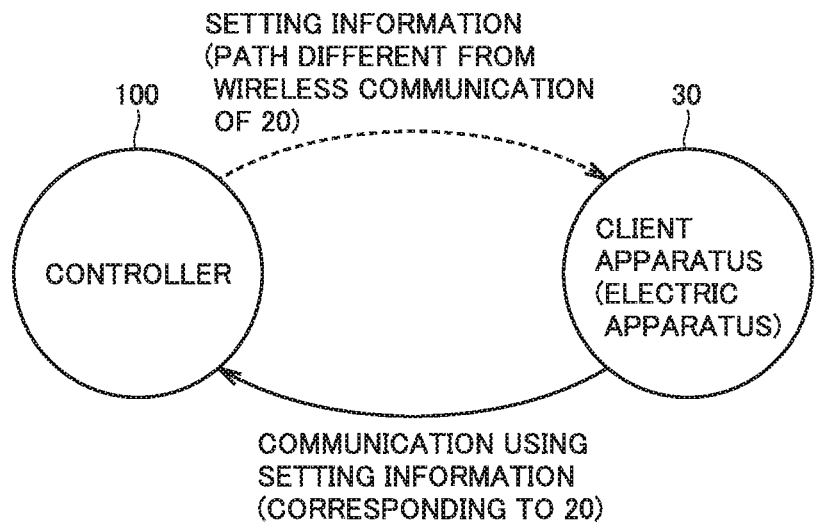
FIG. 4 is a conceptual diagram illustrating a connection setup process in the communication system according to the present embodiment.

Therefore, in the communication system according to the present embodiment, as shown in FIG. 4, a connection setup process is performed without using wireless communication in accordance with a communication protocol common to wireless home network 20.

Referring to FIG. 4, in the present embodiment, predetermined setting information necessary for each client apparatus (electric apparatus 30) to communicate with controller 100 (hereinafter simply referred to as setting information) is conveyed to each client apparatus (electric apparatus 30) through a path different from wireless communication forming wireless home network 20. For example, in the first embodiment, a portable operation terminal device is used to form a path for conveying setting information. The setting information includes PIN code in the PIN (Personal Identification Number) code system, SSID (Service Set Identifier) in the WPS system, and cryptographic key. In the following, it is assumed that setting information is configured with a code including a plurality of numerals and/or alphabetical letters.

Referring to FIG. 1 again, communication system 10 according to the first embodiment further includes a portable operation terminal device 50 for inputting setting information to a client apparatus (electric apparatus 30). Operation terminal device 50 is configured to communicate with each client apparatus (electric apparatus 30) through remote operation from a relatively proximate position. Operation terminal device 50 includes an operation unit 52 for receiving the user's operation command and a display unit 54 for displaying a state of operation terminal device 50 about connection setup. Operation terminal device 50 hereinafter may be simply referred to as remote controller 50. Remote 50 corresponds to an embodiment of "input device" for writing setting information into each client apparatus (electric apparatus 30).

Figure 5:
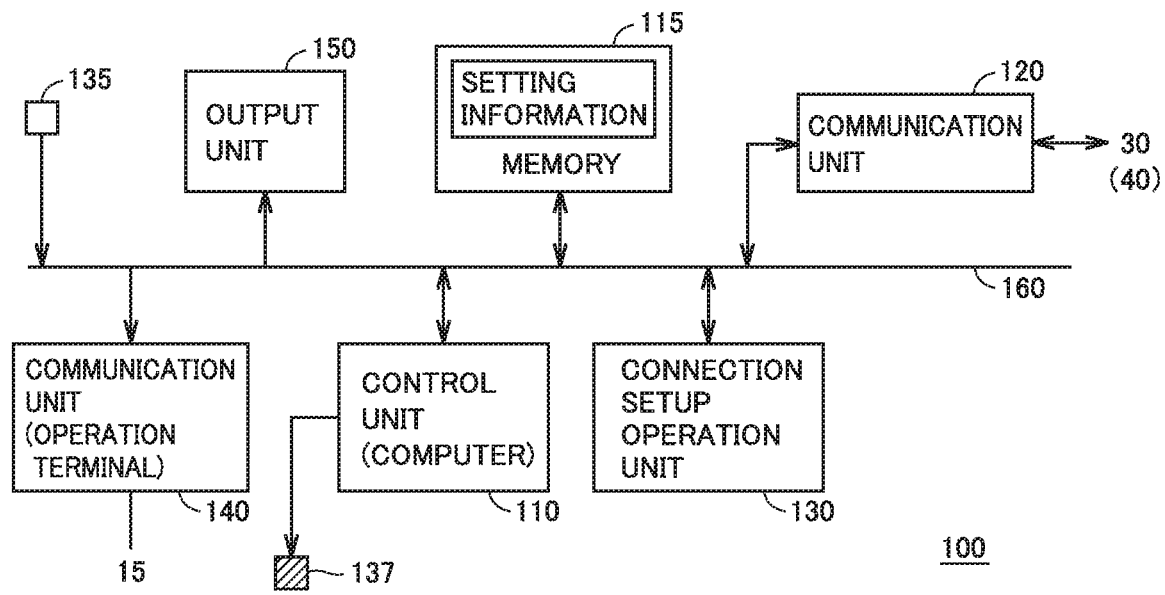
FIG. 5 is a block diagram illustrating a configuration example of a controller shown in FIG. 1.

FIG. 5 is a block diagram illustrating a configuration example of controller 100 shown in FIG. 1.

Referring to FIG. 5, controller 100 includes a control unit 110, a memory 115, communication units 120, 140, a connection setup operation unit 130, an output instruction unit 135, a display LED 137, and an output unit 150. The elements in controller 100 can exchange information with each other via a communication bus 160.

Control unit 110 includes, for example, a computer including a CPU (Central Processing Unit) and a memory. Control unit 110 executes a program stored in memory 115 to execute processing described later to control each component in controller 100.

Memory 115 includes, for example, a nonvolatile memory such as a flash memory. Memory 115 stores a program to be executed by control unit 110 as well as a variety of data to be used for processing by control unit 110. Further, memory 115 stores setting information. Data read and write on memory 115 is controlled by control unit 110.

Communication unit 120 includes an interface for communication in accordance with a communication protocol used in wireless home network 20. As will be described later, a communication unit having the same function is provided also on the client apparatus (electric apparatus 30) device side so that communication unit 120 can wirelessly communication with each of a plurality of client apparatuses (electric apparatuses 30) in accordance with the communication protocol. Communication unit 120 supplies the received signal and/or data to control unit 110 and transmits a signal and/or data transmitted from control unit 110 to an apparatus (here, electric apparatus 30 serving as a client apparatus) external to controller 100 in accordance with the communication protocol.

Communication unit 140 is configured to communicate with operation terminal 15. Communication unit 140 mutually communicates a signal with operation terminal 15 through wired communication or wireless communication. This allows controller 100 to detect the user for operation terminal 15 and control display content on display unit 16.

Connection setup operation unit 130 is provided for inputting user operation to start a connection setup process illustrated in FIG. 2 and FIG. 3. For example, connection setup operation unit 130 can be configured with a push switch for the WPS (registered trademark) push button method. That is, the user operates connection setup operation unit 130 to start a connection-accepting state shown in FIG. 2.

Output instruction unit 135 is provided for the user to input an instruction to output setting information (setting information output request) from controller 100. That is, a connection setup process different from the one started by connection setup operation unit 130 can be executed by operating output instruction unit 135.

Output unit 150 is configured to output a code indicating setting information to the user in response to output instruction unit 135 being operated by the user. For example, output unit 150 can be configured with a segment display for displaying a code including numerals and/or alphabetical letters. Alternatively, output unit 150 may be configured with display unit 16 of operation terminal 15. Output unit 150 may be configured to output a sheet having the code printed thereon.

Display LED 137 can be configured with, for example, one or more light-emitting diodes (LEDs). Control unit 110 can control a drive circuit (not shown) for the LEDs so that each LED switches between OFF state, ON state, and flashing state to notify the user of three kinds of statuses. By changing the on/off cycle of the flashing state, each LED can output more kinds of statuses. The display manner by display unit 137 is changed by control unit 110 controlling the drive circuit (not shown) for the LEDs. Here, it is assumed that display LED 137 displays a status about connection setup in controller 100.

Figure 6:
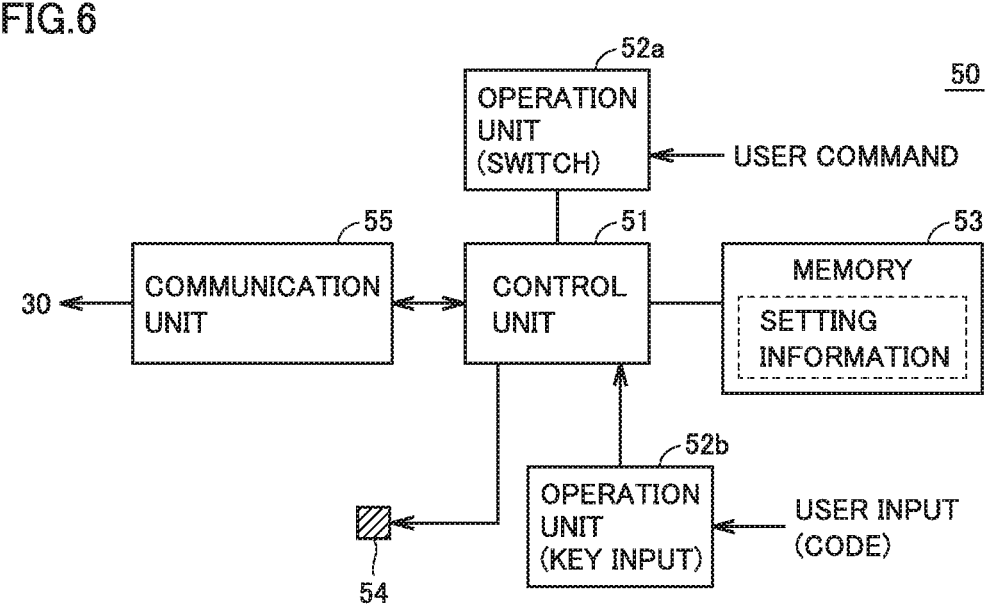
FIG. 6 is a block diagram illustrating a configuration of an operation terminal device (remote controller) shown in FIG. 1.

FIG. 6 is a block diagram illustrating a configuration of the operation terminal device (remote controller) shown in FIG. 1.

Referring to FIG. 6, remote controller 50 includes a control unit 51, operation units 52a, 52b, a memory 53, a display unit 54, and a communication unit 55. Control unit 51 includes, for example, a computer. Control unit 51 can execute a program stored in the memory to control the operation of remote controller 50.

Memory 53 includes a nonvolatile memory, similar to memory 115, and stores a program and data for control to be executed by control unit 51. Data read and write on memory 53 is controlled by control unit 51.

Operation unit 52a corresponds to a partial element of operation unit 52 shown in FIG. 1 for inputting an instruction to start connection setup through input/output of setting information. Operation unit 52a is configured with, for example, hard switches such as push buttons or soft switches appearing on the touch panel.

Operation unit 52b corresponds to a partial element of operation unit 52 shown in FIG. 1 for key-input of setting information by the user. Operation unit 52a is configured with, for example, a keyboard appearing on the touch panel or a ten-key pad for number input.

Control unit 51 can detect the presence/absence of user operation on operation unit 52a and content of a code input to operation unit 52b by the user, based on an electrical signal output by operation unit 52a, 52b in accordance with operation by the user.

The user can input setting information obtained by operation unit 52b from output unit 150 (FIG. 5) to remote controller 50. Control unit 51 writes the setting information input by operation unit 52b into memory 53. The setting information input to remote controller 50 is retained in memory 53.

Communication unit 55 is configured to communicate with an apparatus (here, electric apparatus 30) external to remote controller 50, in a manner of communication different from wireless communication of wireless home network 20. Communication unit 55 is directed to one-to-one communication with a nearby apparatus. For example, communication unit 55 is configured to communicate with an apparatus external to remote controller 50 through wireless communication with higher directivity and/or at shorter communication distance, compared with wireless communication of wireless home network 20. For example, communication unit 55 includes a light-emitting port and a light-receiving port of infrared communication to communicate with an external apparatus through infrared communication. Alternatively, communication unit 55 may be configured to communicate with an external apparatus through NFC (Near Field Communication).

Alternatively, communication unit 55 may be configured to communicate with an apparatus external to remote controller 50 through wired communication through a communication cable in accordance with a predetermined communication standard. In this case, communication unit 55 includes a connector fitted to a plug at an end of the communication cable.

Display unit 54 includes one or more LEDs, similar to the LEDs included in display unit 137 of controller 100. Display unit 54 also can display a plurality of statuses about connection setup by changing display manners of each LED (switching OFF state, ON state, and flashing state, as well as changing the on/off cycle in the flashing state).

In the first embodiment, remote controller (operation terminal device) 50 may be provided as a terminal dedicated to connection setup or may be configured as a function of a tablet, a smartphone, a personal computer, and the like. In any case, communication unit 55 has a communication function (wired communication or wireless communication) with an apparatus external to operation terminal device 50, at least including client apparatuses (electric apparatuses 30).

Figure 7:
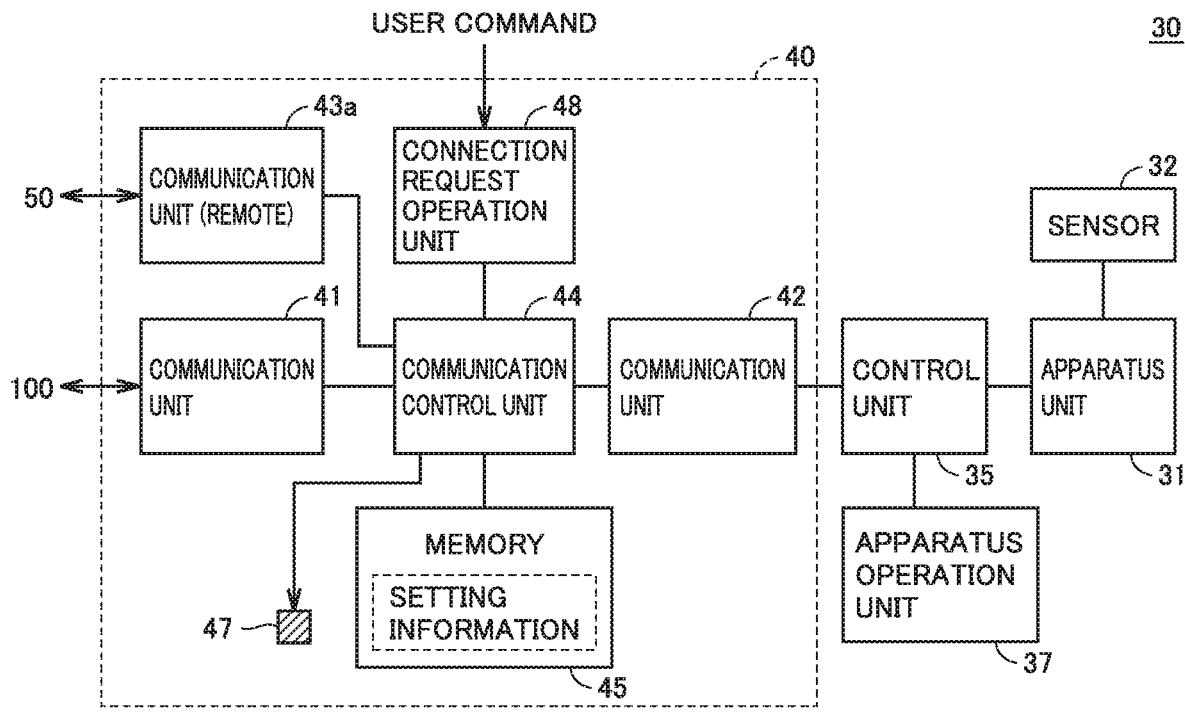
FIG. 7 is a block diagram illustrating a configuration example of an electric apparatus (client apparatus) shown in FIG. 1.

FIG. 7 is a block diagram illustrating a configuration example of electric apparatus 30 (client apparatus) shown in FIG. 1.

Referring to FIG. 7, electric apparatus 30 includes an apparatus unit 31, a sensor 32, a control unit 35, an apparatus operation unit 37, and a communication adaptor 40. As described above, communication adaptor 40 may be contained in electric apparatus 30 or may be configured as an apparatus independent of electric apparatus 30.

Apparatus unit 31 collectively refers to an apparatus for fulfilling original functions of electric apparatus 30. Apparatus unit 31 is provided with a sensor 32 as appropriate. Apparatus operation unit 37 is provided for the user to input an operation instruction to electric apparatus 30. Apparatus operation unit 37 may be provided directly in electric apparatus 30 or may be provided with a capability of remote control.

For example, when electric apparatus 30 is an air conditioner, apparatus unit 31 includes a compressor and a blower, and sensor 32 includes a temperature sensor and a humidity sensor. Apparatus operation unit 37 receives a command to start or stop the air conditioner as well as setting temperature and operation mode (cooler/heater/blower/dehumidifier) settings as an operation instruction. Alternatively, electric apparatus 30 as a client apparatus may be configured as a single sensor, such as human detecting sensor or temperature detecting sensor. In this case, communication adaptor 40 is arranged corresponding to the single sensor.

Control unit 35 is typically configured with a microcomputer and controls apparatus unit 31 such that apparatus unit 31 operates in accordance with an operation instruction to apparatus operation unit 37, based on a detection value by sensor 32.

Communication adaptor 40 includes communication units 41, 42, 43a, a communication control unit 44, a memory 45, a display unit 47, and a connection request operation unit 48.

Communication unit 41 includes an interface for communication in accordance with a communication protocol common to communication unit 120. Communication unit 41 supplies the received data to communication control unit 44 in accordance with the communication protocol and transmits data transmitted from communication control unit 44 to an apparatus (here, controller 100) external to the client apparatus (electric apparatus 30).

Communication unit 42 is configured to form a communication path (for example, serial communication path) for transmitting/receiving data to/from control unit 35. The communication path may be either wired (for example, communication line compliant with RS-232C standards) or wireless.

Communication unit 43a is configured to communicate with remote controller 50 with a communication function (wired communication or wireless communication) similar to communication unit 55 of remote controller 50.

Memory 45 includes a nonvolatile memory, similar to memories 53, 115. Data read and write on memory 45 is controlled by communication control unit 44.

Communication control unit 44 controls communication units 41, 42 so as to transmit/receive a signal or data between control unit 35 of electric apparatus 30 (client apparatus) and controller 100. Communication control unit 44 includes a memory 45 for storing information for data communication. Communication control unit 44 also controls communication unit 43a so as to transmit/receive a signal or data to/from remote controller 50.

Further, communication control unit 44 receives setting information from remote controller 50 through communication using communication unit 43a and then writes the received setting information into memory 45. The setting information input from remote controller 50 to a client apparatus (electric apparatus 30) is thus retained in memory 53.

Communication control unit 44 also controls display unit 47 in accordance with a state (status) of communication adaptor 40. Display unit 47 also can be configured with one or more LEDs, similar to display unit 54 of remote controller 50. The LEDs can display a plurality of statuses by switching OFF state, ON state, and flashing state as well as by changing the on-off cycle in the flashing state.

Connection request operation unit 48 is provided for inputting user operation to start the connection setup process illustrated in FIG. 2 and FIG. 3. That is, when the user operates connection request operation unit 48, a connection request signal illustrated in FIG. 2 is output toward controller 100. For example, connection request operation unit 48 also can be configured with a push switch for the WPS push button method, similar to connection setup operation unit 130 of controller 100.

The control process during connection setup in the communication system according to the first embodiment will now be described.

Figure 8:
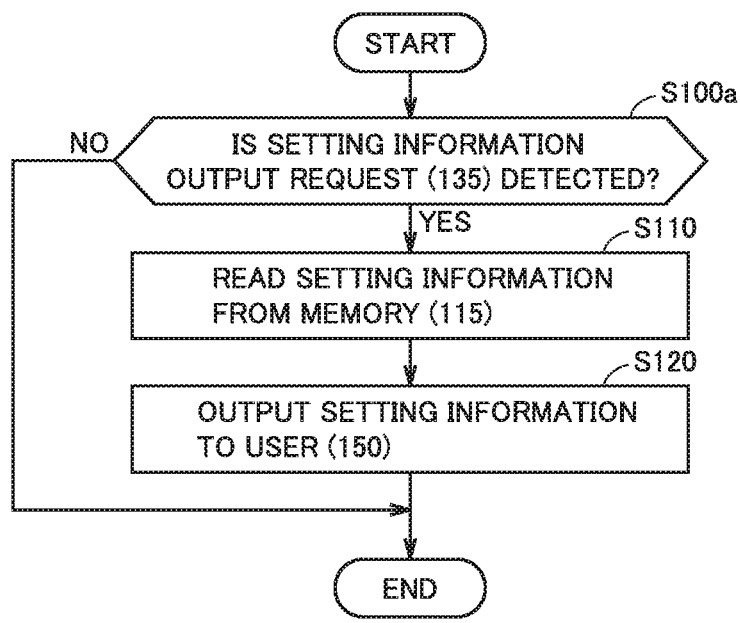
FIG. 8 is a flowchart illustrating a control process of connection setup in the controller in the communication system according to the first embodiment.

FIG. 8 is a flowchart illustrating a control process of connection setup in controller 100 in the communication system according to the first embodiment. The control process shown in FIG. 8 can be performed by control unit 110 (FIG. 5) of controller 100.

Referring to FIG. 8, at step S100a, if user operation on output instruction unit 135 (FIG. 5), that is, input of a setting information output request to controller 100 is detected (YES in the determination at S100a), control unit 110 proceeds to step S110.

At step S110, control unit 110 reads setting information from memory 115 and then, at step S120, outputs the setting information to the user using output unit 150.

On the other hand, if user operation on output instruction unit 135 (FIG. 5) is not detected (NO in the determination at S100a), output of the setting information at steps S110, S120 is not executed. The control process shown in FIG. 8 may not be performed periodically but may be performed such that the process subsequent to step S110 is triggered by detection of user operation on output instruction unit 135.

Figure 9:
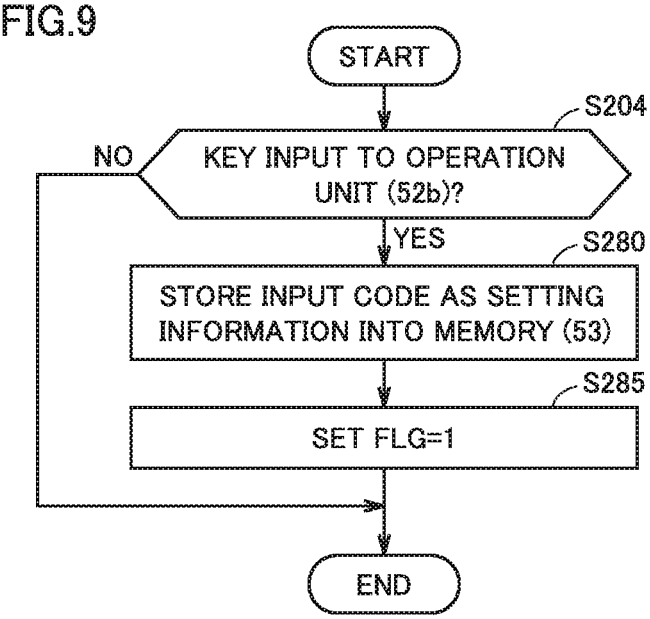
FIG. 9 is a flowchart illustrating the process of inputting setting information to the remote controller in the communication system according to the first embodiment.

FIG. 9 is a flowchart illustrating a process of inputting setting information to remote controller 50 in the communication system according to the first embodiment. The control process shown in FIG. 9 can be executed by control unit 51 (FIG. 6) of remote controller 50.

Referring to FIG. 9, at step S204, if key input by the user to operation unit 52b (FIG. 6), that is, input of setting information to remote controller 50 is detected (YES in the determination at S204), control unit 51 proceeds to step S280.

At step S280, control unit 51 writes the input setting information into memory 53. The setting information is thus retained in memory 53. Further, at step S285, control unit 51 sets flag FLG to 1. Flag FLG indicates whether setting information is retained in memory 53, and FLG=0 is set in the initial state while FLG=1 indicates a state in which setting information is retained in memory 53. Preferably, remote controller 50 is configured to have the function of clearing flag FLG to 0 in accordance with predetermined user operation (for example, reset operation by a not-shown predetermined button).

When user operation on operation unit 52b is not detected (NO in the determination at S204), the process at steps S280, S285 is not executed. The control process shown in FIG. 9 may not be performed periodically but may be performed in such a manner the process subsequent to step S280 is triggered by detection of user operation on operation unit 52b.

Figure 10:
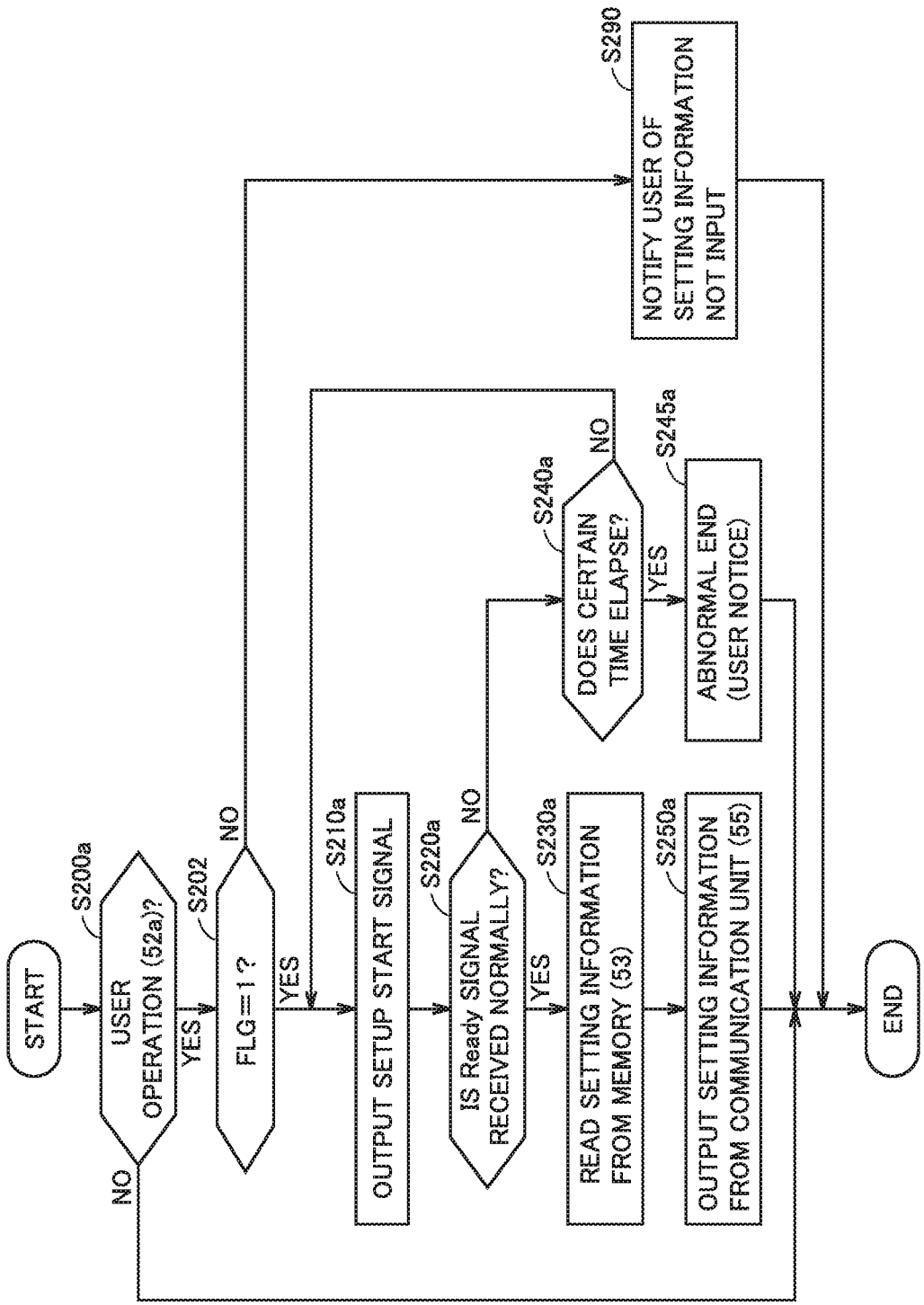
FIG. 10 is a flowchart illustrating the process of outputting setting information from the remote controller in the communication system according to the first embodiment.

FIG. 10 is a flowchart illustrating the process of outputting setting information from remote controller 50 in the communication system according to the first embodiment. The control process shown in FIG. 10 also can be performed by control unit 51 (FIG. 6) of remote controller 50.

Referring to FIG. 10, if user operation on operation unit 52a (FIG. 6), that is, a setting start instruction from the user is given (YES in the determination at S200a), control unit 51 proceeds to step S202.

At step S202, control unit 51 confirms whether flag FLG=1. When FLG=0 (NO in the determination at S202), setting information is not yet input to remote controller 50 and therefore connection setup cannot be started. Thus, at step S290, control unit 51 notifies the user that setting information is not yet input to remote controller 50, and the process ends. For example, at step S290, the user notice can be given by controlling the LED in display unit 54 in a predetermined display color and/or display manner.

When FLG=1 (YES in the determination at S202), at step S210a, control unit 51 outputs a setup start signal using communication unit 55. The setup start signal can be received by communication unit 43a (FIG. 7) on the client apparatus side.

At step S220a, control unit 51 determines whether Ready signal returned from the client apparatus (electric apparatus 30) receiving the setup start signal has been received normally by communication unit 55.

If Ready signal is received normally by communication unit 55 (YES in the determination at S220a), control unit 51 reads the setting information retained in memory 53, at step S230a, and outputs the setting information from remote controller 50 using communication unit 55, at step S250a.

On the other hand, at step S240a, control unit 51 determines whether a certain time has elapsed since the output of the setup start signal is started. Until a certain time elapses (NO in the determination at S240a), the setup start signal is output at step S210a until Ready signal is received normally. If a certain time elapses while Ready signal is not received normally (YES in the determination at S240a), at step S245a, control unit 51 recognizes abnormal end. In this case, it is preferable that the user is notified of abnormal end by controlling the LED in display unit 64 in a predetermined display color and/or display manner different from step S290.

That is, after a setup start signal is output in accordance with user operation on operation unit 52a, if Ready signal is returned within a certain time from the client apparatus receiving the setup start signal, remote controller 50 outputs setting information toward the client apparatus.

The control process shown in FIG. 10 also may not be performed periodically and may be performed in such a manner that the process subsequent to step S202 is triggered by detection of user operation on operation unit 52a.

Figure 11:
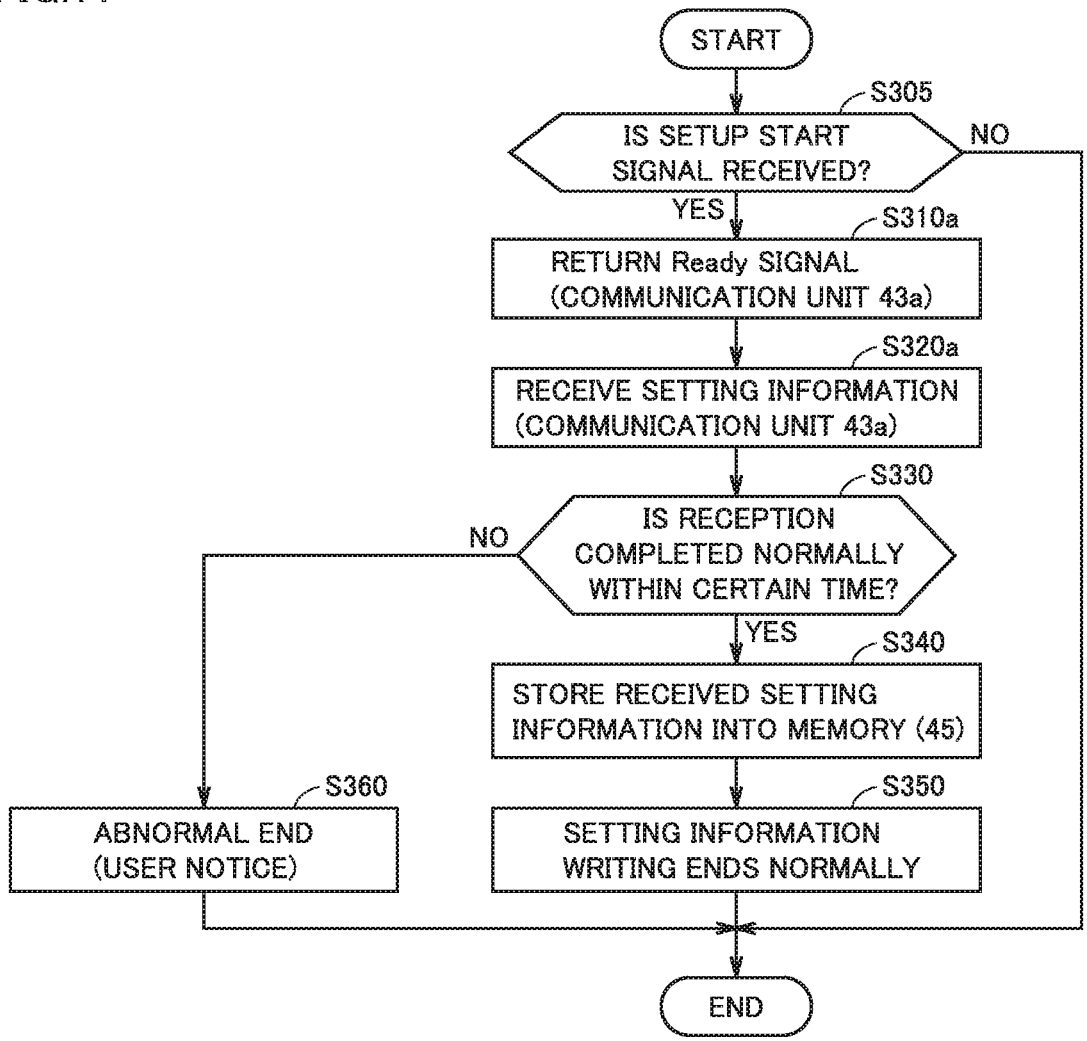
FIG. 11 is a flowchart illustrating a control process of connection setup in a client apparatus in the communication system according to the first embodiment.

FIG. 11 is a flowchart illustrating a control process of connection setup in a client apparatus (electric apparatus 30) in the communication system according to the first embodiment. The control process shown in FIG. 11 can be performed by communication control unit 44 shown in FIG. 7.

Referring to FIG. 11, at step S305, communication control unit 44 determines whether a setup start signal has been received from remote controller 50 by communication unit 43a. If a setup start signal has been received (YES in the determination at S305), communication control unit 44 proceeds to step S310a and returns Ready signal using communication unit 43a. Further, at step S320a, communication control unit 44 receives setting information output from remote controller 50 at step S250a (FIG. 10) in response to Ready signal returned.

At step S330, communication control unit 44 determines whether reception of the setting information has been completed normally within a certain time after reception of the setup start signal. If the setting information has been received normally (YES in the determination at S330), at step S340, communication control unit 44 stores the received setting information into memory 45. At this point of time, at step S350, communication control unit 44 recognizes that writing of the setting information into the client apparatus (electric apparatus 30) has ended normally. In this case, it is preferable that display unit 47 is controlled such that the user is notified that writing of the setting information has ended normally.

Referring to FIG. 4 again, the client apparatus (electric apparatus 30) with the setting information can wirelessly communicate automatically with controller 100 (communication unit 120) using the setting information through communication unit 41 (FIG. 7). This allows the client apparatus (electric apparatus 30) to connect to wireless home network 20.

Referring to FIG. 11 again, if setting information fails to be received normally within a certain time after reception of the setup start signal (NO in the determination at S330), at step S360, communication control unit 44 recognizes the failure of connection setup. In this case, it is preferable that display unit 47 is controlled in a display manner different from step S350 such that the user is notified of abnormal end of writing of setting information.

The control process shown in FIG. 11 may not be performed periodically but may be performed in such a manner that the process subsequent to step S310 is triggered by reception of the setup start signal from remote controller 50 by communication unit 43a.

As described above, in the communication system according to the first embodiment, unlike the general connection setup shown in FIG. 2 and FIG. 3, setting information for communicating with controller 100 can be written into each client apparatus (electric apparatus 30) through a path using remote controller 50 as "input device".

This enables connection setup to wireless home network 20 without using wireless communication in accordance with a communication protocol common to wireless home network 20, thereby completing the operation of connection setup on each client apparatus irrespective of a situation of the wireless communication between controller 100 and each client apparatus (electric apparatus 30). As a result, for connection setup in the wireless communication network to which a plurality of client apparatuses are connected, the prolonged operation time of connection setup caused by a communication failure is avoided, thereby reducing the operation load and the operation time of connection setup.

In the configuration of the first embodiment, communication between remote controller 50 and each client apparatus (electric apparatus 30) may be encrypted through exchange of a cryptographic key. The operation on output instruction unit 135 of controller 100 and the operation on remote controller 50 may require user authentication. This configuration can increase security.

Modification of First Embodiment

In a configuration example of a modification of the first embodiment, remote controller 50 is also used for output of setting information from controller 100.

Figure 12:
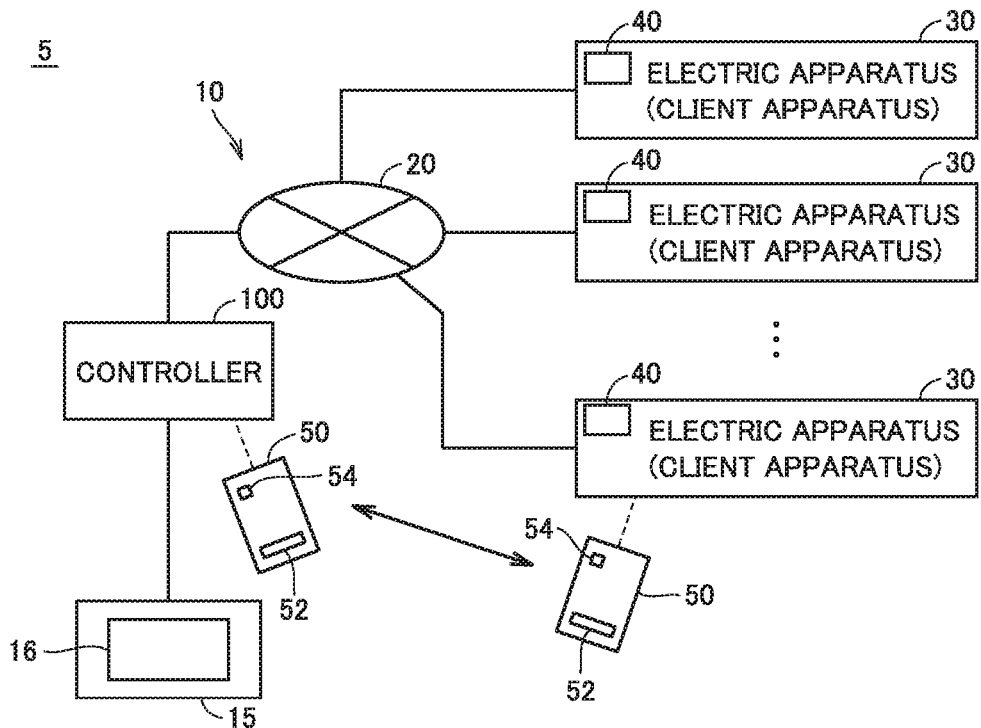
FIG. 12 is a block diagram illustrating an overall configuration of the energy management system which is an application example of the communication system according to a modification of the first embodiment.

FIG. 12 is a block diagram illustrating an overall configuration of the energy management system which is an application example of the communication system according to a modification of the first embodiment.

FIG. 12 differs from FIG. 1 in that the communication system according to the modification of the first embodiment is configured such that remote controller 50 communicates with controller 100 in addition to each client apparatus (electric apparatus 30). The configuration of the other parts in FIG. 12 are similar as in FIG. 1 and will not be further elaborated.

Figure 13:
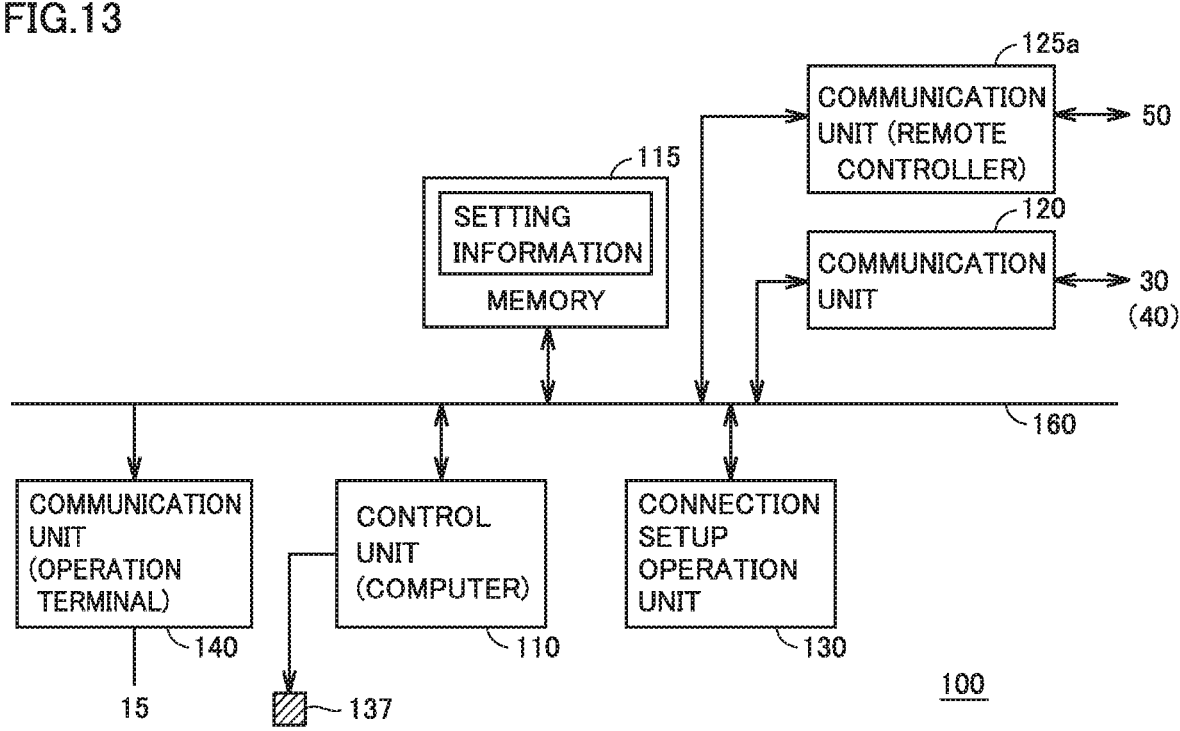
FIG. 13 is a block diagram illustrating a configuration example of the controller in the communication system according to the modification of the first embodiment.

FIG. 13 is a block diagram illustrating a configuration example of the controller in the communication system according to the modification of the first embodiment.

FIG. 13 differs from FIG. 5 in that in the modification of the first embodiment, controller 100 further includes a communication unit 125a.

Communication unit 125a is configured to communicate with remote controller 50 using the communication function (wired communication or wireless communication) similar to communication unit 55 of remote controller 50. With this configuration, an instruction to output setting information of controller 100 (setting information output request), which is input using output instruction unit 135 by the user in the first embodiment, can be input from remote controller 50 through communication using communication unit 125a. Therefore, in the modification of the first embodiment, the arrangement of output instruction unit 135 shown in FIG. 5 can be eliminated.

In addition, the setting information, which is output from output unit 150 in the first embodiment, may be directly output to remote controller 50 through communication using communication unit 125a. Therefore, in the modification of the first embodiment, the arrangement of output unit 150 shown in FIG. 5 can be eliminated. As a result, in remote controller 50, the need for key input of setting information by the user using operation unit 52b (FIG. 6) can be eliminated. This can eliminate the arrangement of operation unit 52b in remote controller 50, though not shown.

The configuration of the other parts of controller 100 in FIG. 13 is similar as in FIG. 5 and will not be further elaborated.

Figure 14:
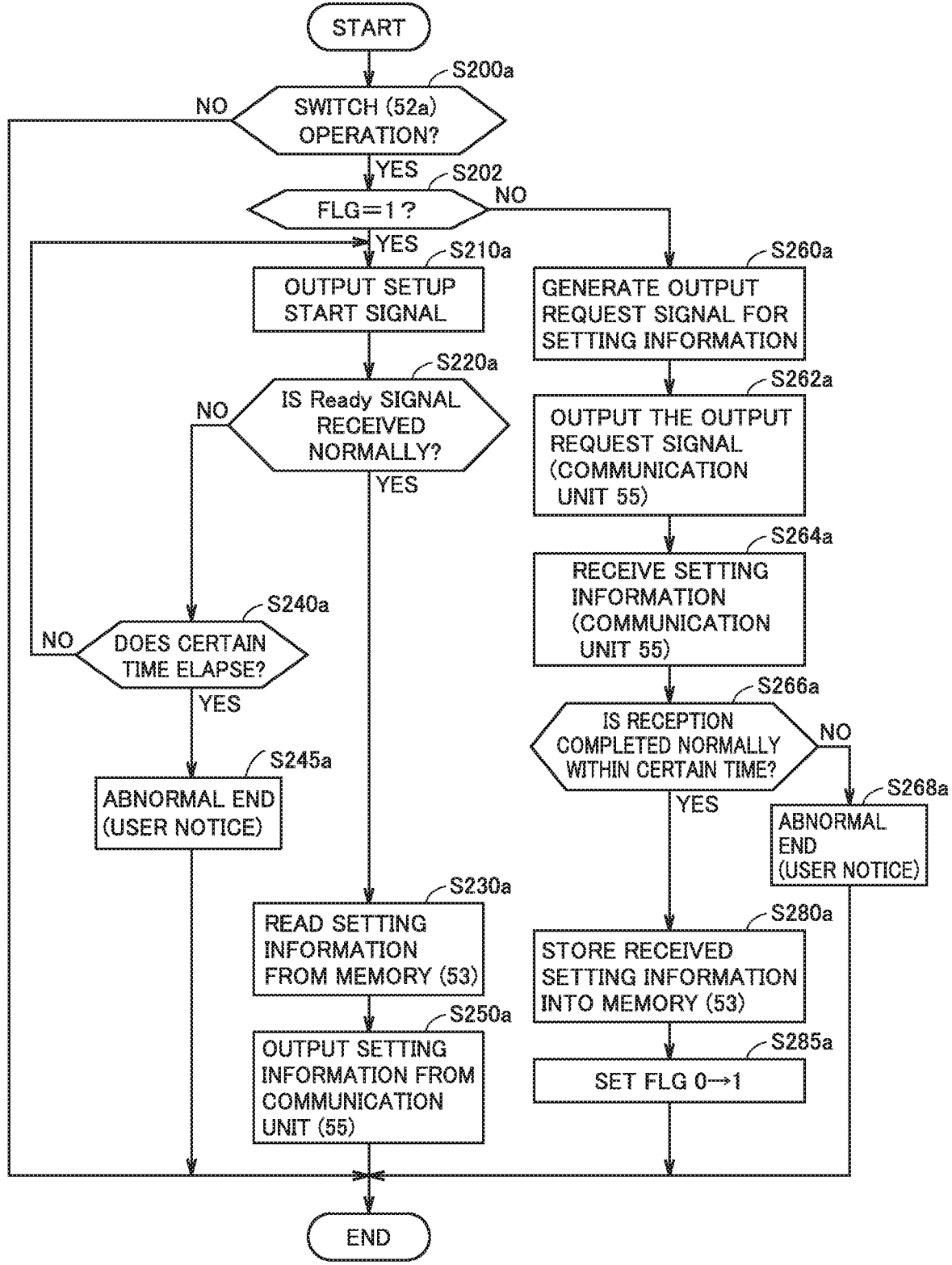
FIG. 14 is a flowchart illustrating a control process of connection setup in the remote controller in the communication system according to the modification of the first embodiment.

FIG. 14 is a flowchart illustrating a control process of connection setup in the remote controller in the communication system according to the modification of the first embodiment. The control process shown in FIG. 14 can be performed by control unit 51 in the same manner as in the control process in FIG. 10.

FIG. 14 differs from FIG. 10 in that in the communication system according to the modification of the first embodiment, if a setup start instruction is given from the user (YES in the determination at S200a), the control process when FLG=0 (NO in the determination at S202) differs from that in the first embodiment.

When FLG=0 (NO in the determination at S202), control unit 51 generates an output request signal for setting information to controller 100, at step S260a, and outputs the output request signal from remote controller 50 using communication unit 55, at step S262a. The setup start signal can be received by communication unit 125a (FIG. 13) of controller 100.

Figure 15:
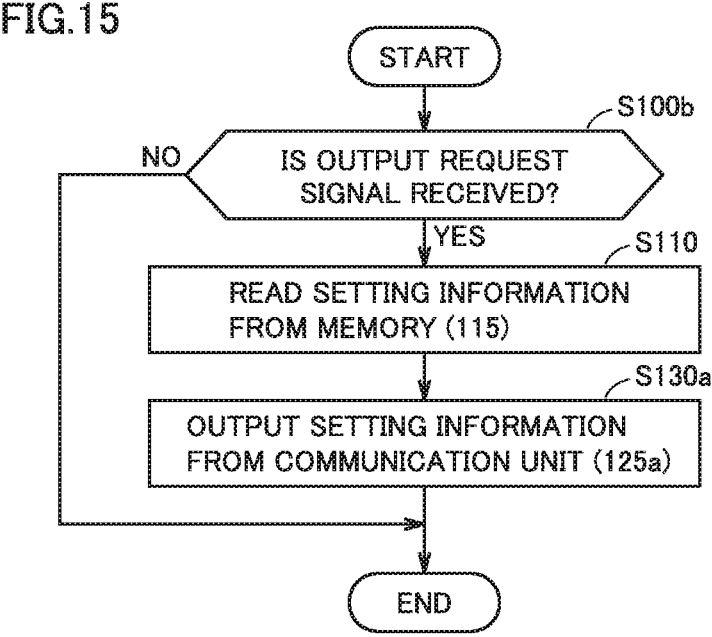
FIG. 15 is a flowchart illustrating a control process of connection setup in the controller in the communication system according to the modification of the first embodiment.

FIG. 15 is a flowchart illustrating a control process of connection setup in the controller in the communication system according to the modification of the first embodiment. The control process shown in FIG. 15 can be executed by control unit 110 (FIG. 13) of controller 100.

Referring to FIG. 15, at step S100b, if an output request signal from remote controller 50 is received by communication unit 125a (YES in the determination at S100b), control unit 110 proceeds to step S110 similar as in FIG. 10. Setting information is then read from memory 115. Further, at step S130a, control unit 110 outputs setting information using communication unit 125a. The setting information output from communication unit 125a can be received by communication unit 55 of remote controller 50.

On the other hand, when an output request signal from remote controller 50 is not received (NO in the determination at S100b), the output of setting information at steps S110, S130a is not performed. The control process shown in FIG. 15 also may not be performed periodically but may be performed in such a manner that the process subsequent to step S110 is triggered by reception of an output request signal from remote controller 50.

Referring to FIG. 14 again, after outputting the output request signal (S262a), at step S264a, control unit 51 receives the setting information output from controller 100 in response to the output request signal, using communication unit 55. Further, at step S266*a*, control unit 51 determines whether a certain time has elapsed after the output request signal is output. If setting information is received before a certain time elapses (YES in the determination at S266*a*), control unit 51 stores the received setting information into memory 53, at step S280*a*, and sets flag FLG to 1, at step S285*a*. In this way, the setting information retained in controller 100 is transferred to remote controller 50.

On the other hand, if setting information is not received even after a certain time elapses (NO in the determination at S266*a*), at step S268*a*, control unit 51 recognizes that input of setting information to remote controller 50 ends abnormally. At step S268*a*, it is preferable that display unit 47 is controlled such that the user is notified of abnormal end.

After FLG=1 is set, when operation unit 52*a* is operated by the user, the determination at step S202 is YES, and then steps S210*a* to S250*a* similar as in the first embodiment (FIG. 10) are performed. The setting information is thus output from remote controller 50 to the client apparatus (electric apparatus 30) in the same manner as in the first embodiment. In the client apparatus (electric apparatus 30), setting information can be written from remote controller 50 into the client apparatus (electric apparatus 30) through the control process similar as in FIG. 11. The connection setup to wireless home network 20 is thus completed for the client apparatus (electric apparatus 30).

In the control described in the modification of the first embodiment, flag FLG is introduced to identify user operation on common operation unit 52*a* as output of an output request signal to controller 100 (S260*a*, S262*a*) or as output of a setup start signal to the client apparatus (electric apparatus 30) (S210*a*). By contrast, operation unit 52*a* may be configured such that a command to controller 100 and a command to a client apparatus (electric apparatus 30) may be input using different switches. In this case, the similar control process can be implemented by selectively starting the process subsequent to step S210*a* (command to controller 100) or the process subsequent to step S260*a* (command to the client apparatus) according to the corresponding switch operation.

As described above, according to the modification of the first embodiment, in addition to the effects described in the first embodiment, setting information written from remote controller 50 into each client apparatus (electric apparatus 30) can be input to remote controller 50 without the need for code input by the user. As a result, the operation load and the operation time of connection setup can be further reduced.

In the configuration of the modification of the first embodiment, communication between remote controller 50 and each client apparatus (electric apparatus 30) as well as communication between remote controller 50 and controller 100 may be encrypted through exchange of a cryptographic key. The operation of remote controller 50 may require user authentication. This configuration can increase security.

For security increase, the setting information stored in remote controller 50 (memory 53) may be automatically erased by control unit 51 when a predetermined time elapses. Alternatively, output to an apparatus external to remote controller 50 may be prohibited when a predetermined time elapses.

In the configuration of the first embodiment and the modification thereof, communication unit 120 of controller 100 corresponds to "first communication unit", output unit 150 corresponds to "information output unit", memory 115 corresponds to "third memory unit", and communication unit 125*a* corresponds to "fifth communication unit". The function of "output control unit" is implemented by control unit 110.

Further, communication unit 41 of the client apparatus (electric apparatus 30) corresponds to "second communication unit", communication unit 43*a* corresponds to "third communication unit", and memory 45 corresponds to "first memory unit" or "memory unit". As described above, remote controller 50 corresponds to an embodiment of "input device", and in remote controller 50, operation unit 52*a* corresponds to "first input operation unit" and "third input operation unit", operation unit 52*b* corresponds to "second input operation unit", communication unit 55 corresponds to "fourth communication unit", and memory 53 corresponds to "second memory unit". The operation units (52*a*, 52*b*) corresponding to "first to third input operation units" may be configured as separate members or may be configured as a common member, such as soft switches on a common touch panel.

Second Embodiment

In a second embodiment, a device different from a remote controller is used to form an input path of setting information to each client apparatus (electric apparatus 30).

Figure 16:
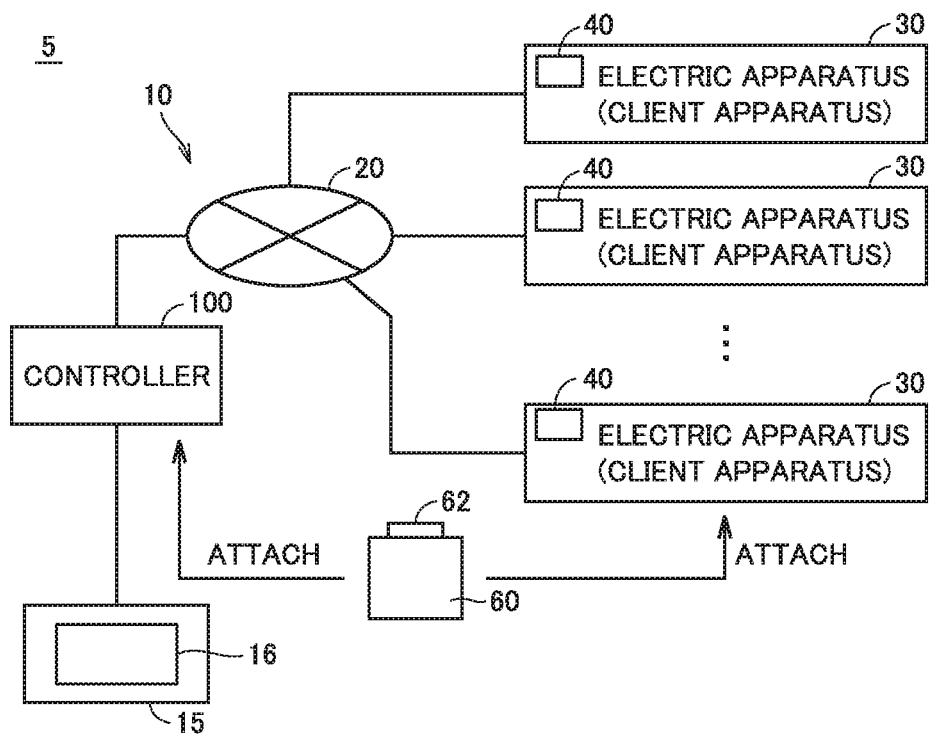
FIG. 16 is a block diagram illustrating an overall configuration of the energy management system to which the communication system according to a second embodiment of the present invention is applied.

FIG. 16 is a block diagram illustrating an overall configuration of the energy management system to which the communication system according to the second embodiment is applied.

FIG. 12 differs from FIG. 1 in that in the communication system according to the second embodiment, setting information is transferred using a cartridge 60 instead of remote controller 50. Cartridge 60 has an attachment part 62 formed to be attachable to controller 100 and each client apparatus (electric apparatus 30). For example, cartridge 60 may be configured with a USB memory.

When attachment part 62 is attached to controller 100, cartridge 60 can form a communication path to controller 100. Similarly, when attachment part 62 is attached to a client apparatus (electric apparatus 30), cartridge 60 can form a communication path to the client apparatus (electric apparatus 30). That is, in the second embodiment, cartridge 60 corresponds to an embodiment of "input device" for writing setting information into each client apparatus (electric apparatus 30). The configuration of the other parts in FIG. 16 is similar as in FIG. 1 and will not be further elaborated.

Figure 17:
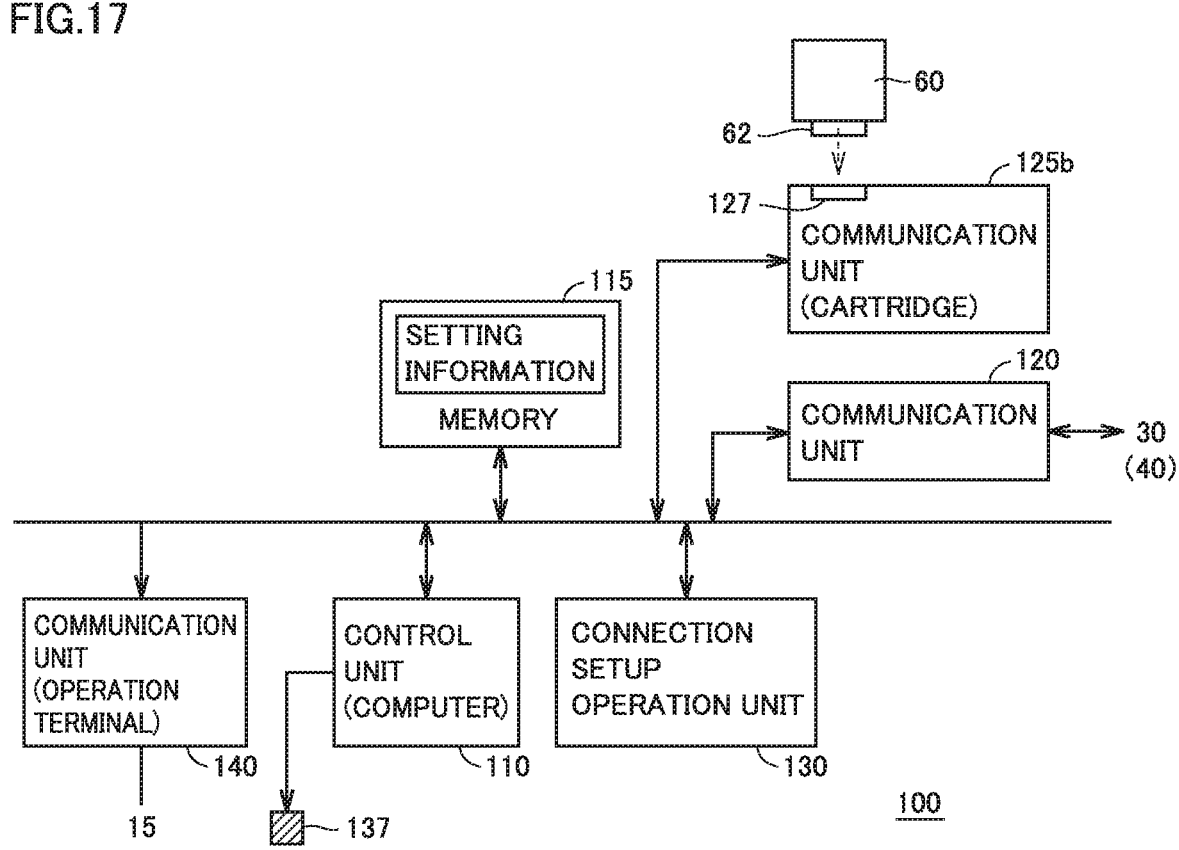
FIG. 17 is a block diagram illustrating a configuration example of the controller in the communication system according to the second embodiment.

FIG. 17 is a block diagram illustrating a configuration example of the controller in the communication system according to the second embodiment.

FIG. 17 differs from FIG. 5 in that in the second embodiment, controller 100 further includes a communication unit 125*b*. Communication unit 125*b* is provided with an attachment-receiving part 127 in which attachment part 62 of cartridge 60 is mounted. For example, attachment-receiving part 127 has a shape mechanically fitted to attachment part 62 and has a contact (not shown) forming electrical connection with attachment part 62 when being fitted. Communication unit 125*b* is configured to form a communication path to cartridge 60 through electrical connection via the contact when attachment part 62 is mounted in attachment-receiving part 127. For example, attachment-receiving part 127 has a circuit configured such that the voltage level of a predetermined node changes with formation of the setting, thereby detecting attachment of cartridge 60. Control unit 110 is also configured to output a predetermined return signal to cartridge 60 when cartridge 60 to attachment-receiving part 127 is detected.

In the second embodiment, an instruction to output setting information (setting information output request) of controller 100 can be input from cartridge 60 attached by the user. The setting information can also be output directly to cartridge 60. Therefore, in the second embodiment, the arrangement of output instruction unit 135 and output unit 150 can be eliminated from the configuration in FIG. 5. The configuration of the other parts of controller 100 in FIG. 17 is similar as in FIG. 5 and will not be further elaborated.

Figure 18:
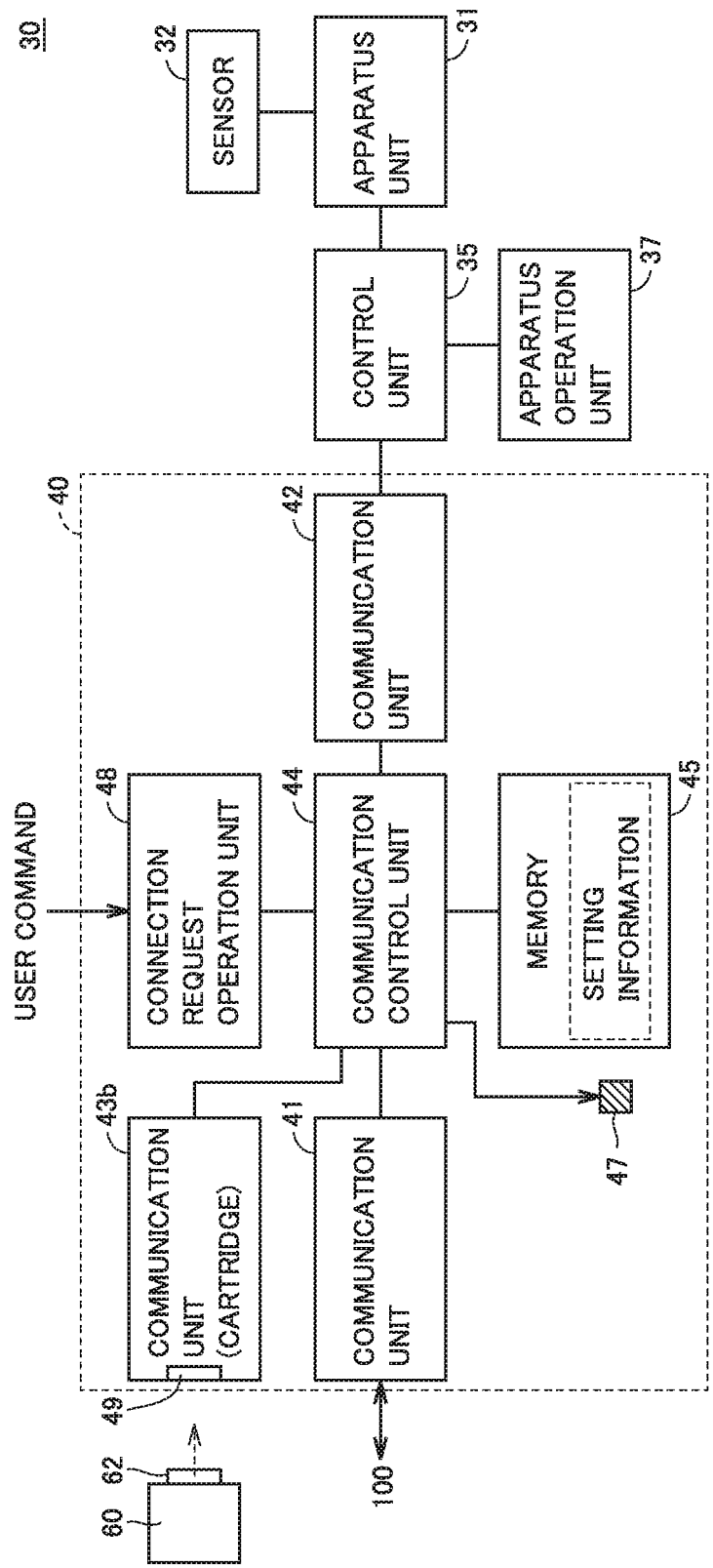
FIG. 18 is a block diagram illustrating a configuration example of the client apparatus (electric apparatus) in the communication system according to the second embodiment.

FIG. 18 is a block diagram illustrating a configuration example of a client apparatus (electric apparatus) in the communication system according to the second embodiment.

FIG. 18 differs from FIG. 7 in that in the second embodiment, communication adaptor 40 of the client apparatus (electric apparatus 30) has a communication unit 43*b* instead of communication unit 43*a*. The configuration of the other parts of communication adaptor 40 in FIG. 18 is similar as in FIG. 7 and will not be further elaborated.

Communication unit 43*b* is provided with an attachment-receiving part 49 in which attachment part 62 of cartridge 60 is mounted. For example, attachment-receiving part 49 can be configured similar to attachment-receiving part 127. Therefore, communication unit 125*b* is configured to form a communication path to cartridge 60 through electrical connection via the contact when attachment part 62 is mounted in attachment-receiving part 49. Further, communication control unit 44 is configured to output a predetermined return signal to cartridge 60 when cartridge 60 to attachment-receiving part 49 is detected.

Figure 19:
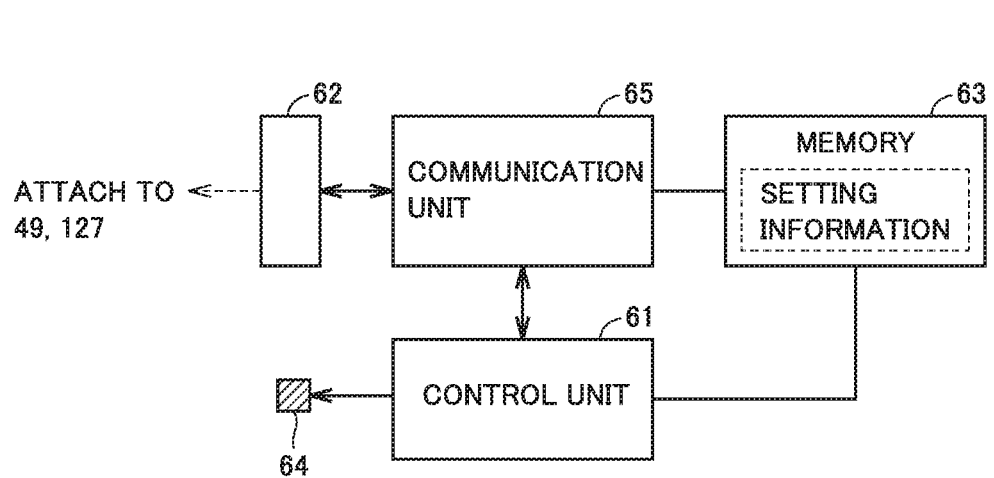
FIG. 19 is a block diagram illustrating a configuration example of a cartridge in the communication system according to the second embodiment.

FIG. 19 is a block diagram illustrating a configuration of the cartridge shown in FIG. 16.

Referring to FIG. 19, cartridge 60 includes a control unit 61, an attachment part 62, a memory 63, a display unit 64, and a communication unit 65.

Attachment part 62 has a shape that can be attached to each of attachment-receiving part 49 of communication unit 43*b* and attachment-receiving part 127 of communication unit 125*b*. For example, attachment part 62 has a shape mechanically fitted to each of attachment-receiving part 49 and attachment-receiving part 127 and has a contact (not shown) forming electrical connection with attachment-receiving parts 49, 127 when being fitted.

Control unit 61 includes a computer, similar to control unit 51 of remote controller 50. Memory 63 includes a nonvolatile memory, similar to memory 53 of remote controller 50. Data read and write on memory 63 is controlled by control unit 61. As will be described later, memory 63 can retain setting information for connection setup.

Communication unit 65 is configured to communicate with an apparatus (controller 100 or each client apparatus (electric apparatus 30)) to which attachment part 62 is attached, using a communication path formed by attachment of attachment part 62. Display unit 64 is configured with one or more LEDs, similar to display unit 54 of remote controller 50, to display a plurality of statuses about connection setup.

Figure 20:
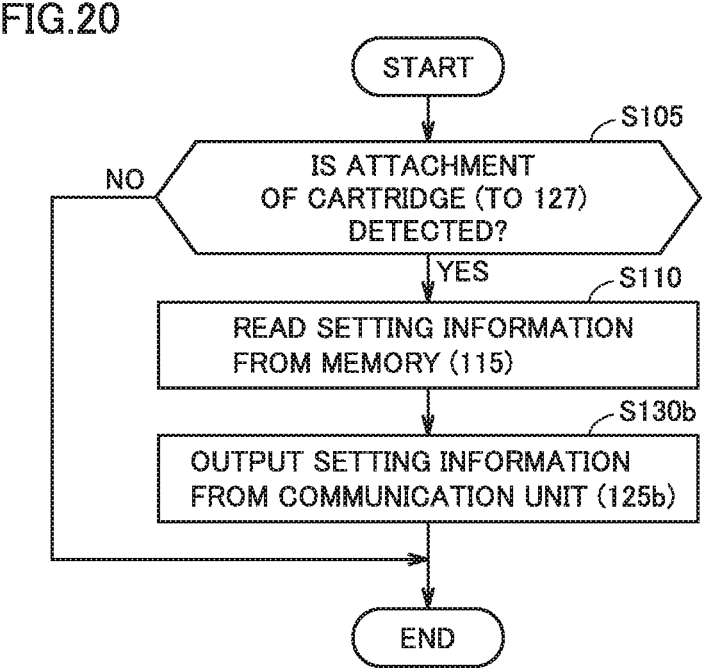
FIG. 20 is a flowchart illustrating a control process of connection setup in the controller in the communication system according to the second embodiment.

FIG. 20 is a flowchart illustrating a control process of connection setup in the controller in the communication system according to the second embodiment. The control process shown in FIG. 20 can be performed by control unit 110 (FIG. 17) of controller 100.

Referring to FIG. 20, at step S105, if attachment of cartridge 60 to attachment-receiving part 127 is detected (YES in the determination at S105), control unit 110 proceeds to step S110 similar as in FIG. 10 and FIG. 15. Setting information is thus read from memory 115. Further, at step S130*b*, control unit 110 outputs setting information to cartridge 60 attached to attachment-receiving part 127, using communication unit 125*b*.

On the other hand, if attachment of cartridge 60 is not detected (NO in the determination at S105), output of setting information at steps S110, S130*b* is not performed. That is, the control process shown in FIG. 20 also may not be performed periodically but may be performed in such a manner that the process subsequent to step S110 is triggered by attachment of cartridge 60.

Figure 21:
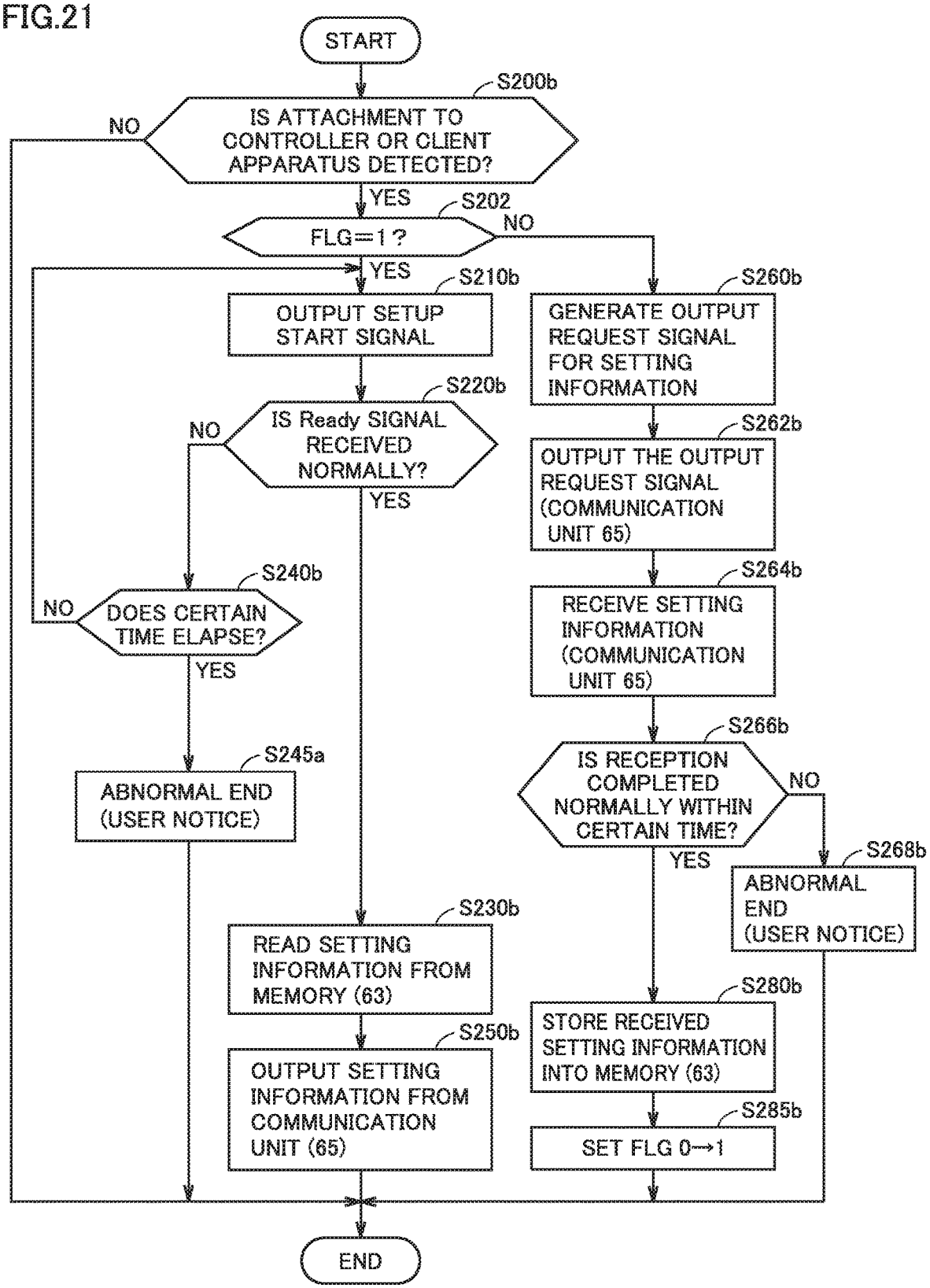
FIG. 21 is a flowchart illustrating a control process of connection setup in the cartridge in the communication system according to the second embodiment.

FIG. 21 is a flowchart illustrating a control process of connection setup in the cartridge in the communication system according to the second embodiment. The control process shown in FIG. 21 can be executed by control unit 61 (FIG. 19).

Referring to FIG. 21, if attachment of attachment part 62 to controller 100 or a client apparatus (electric apparatus 30) is detected through reception of the return signal (YES in the determination at S200*b*), control unit 51 proceeds to step S202 similar as in FIG. 14.

At step S202, control unit 51 confirms whether flag FLG=1. When FLG=0 (NO in the determination at S202), the process proceeds to steps S260*b* to S285*b*. At steps S260*b* to S285*b*, the process similar to steps S260*a* to S285*a* in remote controller 50 as illustrated in FIG. 14 is performed.

Thus, when FLG=0, that is, when setting information is not stored in cartridge 60, an output request signal for setting information is transmitted to controller 100 using a path including attachment part 62 and attachment-receiving part 127, and the setting information transmitted from controller 100 can be stored into memory 63.

When cartridge 60 is attached to the client apparatus (electric apparatus 30) despite FLG=0, reception of setting information is not completed within a certain time and therefore the determination is NO at step S266*b*. Then, at step S268*b*, abnormal end is recognized. In this case, it is preferable that information to prompt the user for attachment to controller 100 is given, for example, by controlling the LED in display unit 64 in a predetermined display color and/or display manner.

When FLG=1 (YES in the determination at S202), control unit 51 proceeds to steps S210*b* to S250*b*. At steps S210*b* to S250*b*, the process similar to steps S210*a* to S250*a* in remote controller 50 as illustrated in FIG. 14 is performed. Thus, when FLG=1, that is, when setting information has already been stored in cartridge 60, at step S230*b*, the setting information stored in memory 63 is read, and at step S250*b*, setting information is output to the outside of cartridge 60 using communication unit 65.

If cartridge 60 is attached to controller 100 despite FLG=1, Ready signal is not returned and therefore the determination at step S240*b* is NO. Then, at step S245*b*, abnormal end is recognized. In this case, it is preferable that the user is notified of abnormal end by controlling the LED in display unit 64 in a predetermined display color and/or display manner different from step S268*b*. It is preferable that cartridge 60 is also configured to have the function of clearing flag FLG to 0 in response to predetermined user operation (for example, reset operation), in the same manner as in remote controller 50.

Figure 22:
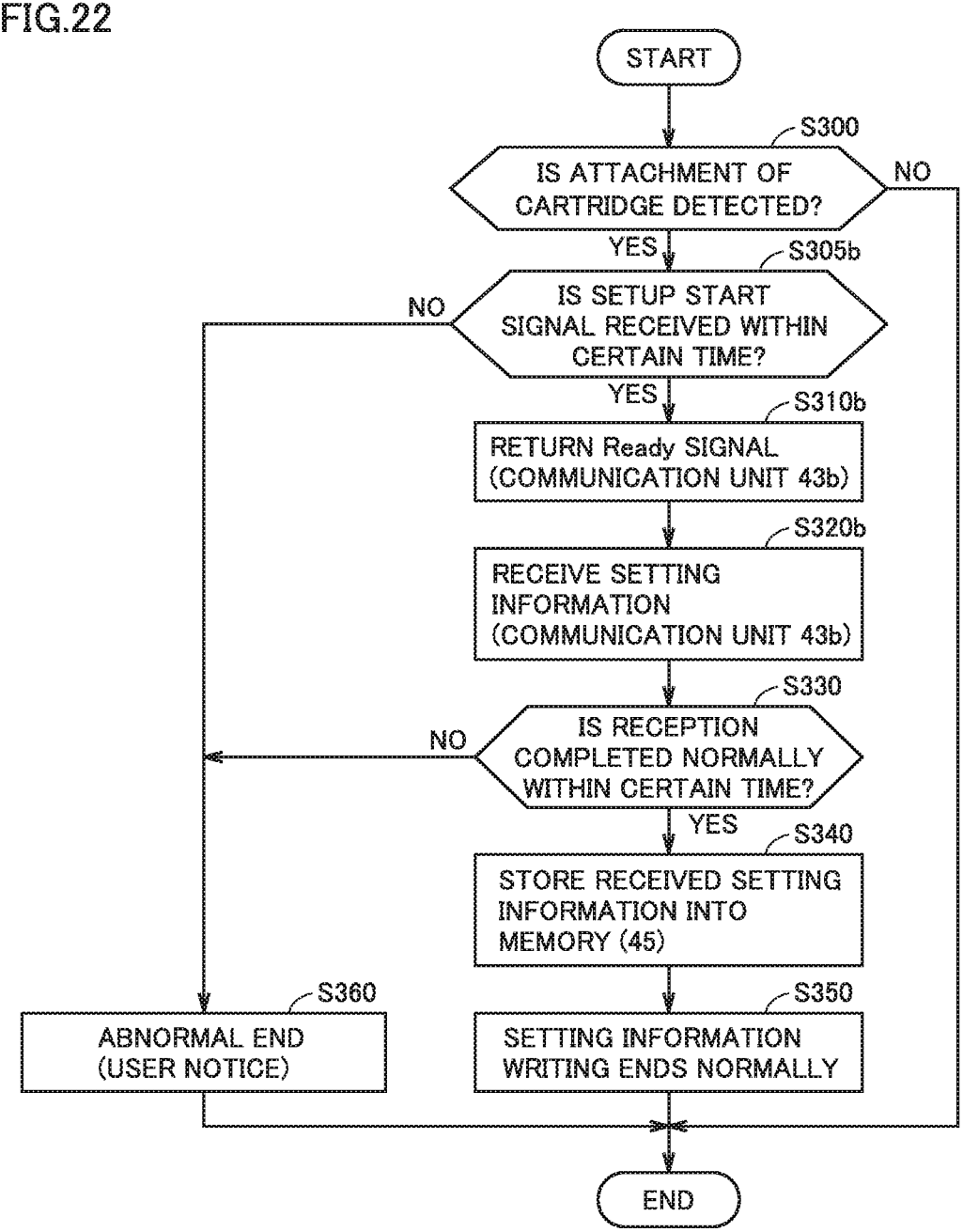
FIG. 22 is a flowchart illustrating a control process of connection setup in the client apparatus in the communication system according to the second embodiment.

FIG. 22 is a flowchart illustrating a control process of connection setup in a client apparatus in the communication system according to the second embodiment. The control process shown in FIG. 11 can be performed by communication control unit 44 in FIG. 18.

Referring to FIG. 22, at step S300, if attachment of cartridge 60 to attachment-receiving part 49 (FIG. 18) is detected (YES in the determination at S300), communication control unit 44 determines whether a setup start signal has been received within a certain time, at step S305*b*. If a setup start signal (step S210*b* in FIG. 21) from cartridge 60 is received (YES in the determination at S305*b*), communication control unit 44 transmits/receives a setup start signal and Ready signal to/from cartridge 60, using communication unit 43*b*, at steps S310*b*, S320*b*. Further, if reception of setting information is completed normally within a certain time at S330 to S350 similar as in FIG. 11, the received setting information can be stored into memory 45 (S340).

If reception of setting information is not completed normally before a certain time elapses after attachment of cartridge 60 is detected, for example, when FLG=0 and cartridge 60 is attached, the determination at step S305*b* or step S330 is NO, and then communication control unit 44 abends writing of setting information (S360). In this case, it is preferable that the LED in display unit 47 is controlled in a predetermined display color and/or display manner such that the user is notified of abnormal end.

As described above, in the communication system according to the second embodiment, setting information for communicating with controller 100 can be written into each client apparatus (electric apparatus 30) through a path using cartridge 60 attachable to each of controller 100 and a client apparatus (electric apparatus 30) as "input device", instead of remote controller 50 in the first embodiment.

With this configuration, connection setup to wireless home network 20 can be performed in the same manner as in the first embodiment, without using wireless communication in accordance with a communication protocol common to wireless home network 20. Therefore, the operation of connection setup for each client apparatus can be completed irrespective of the situation of the wireless communication between controller 100 and each client apparatus (electric apparatus 30).

As a result, for connection setup in the wireless communication network to which a plurality of client apparatuses are connected, the prolonged operation time of connection setup caused by a communication failure is avoided, thereby reducing the operation load and the operation time of connection setup.

In the configuration example described in the second embodiment, the attachment of cartridge 60 allows setting information to be read from controller 100 to cartridge 60. In this case, cartridge 60 may be a general-purpose product for controller 100. By contrast, when cartridge 60 is a dedicated product for each individual controller 100, setting information of the corresponding controller 100 may be written in advance in memory 63 of cartridge 60 before formation of wireless home network 20, that is, at the stage prior to starting of connection setup. For example, setting information may be written in advance in cartridge 60 before factory shipment or on sale.

In the configuration of the second embodiment, for the purpose of increasing security, communication between cartridge 60 and each client apparatus (electric apparatus 30) as well as controller 100 may be encrypted through exchange of a cryptographic key. User authentication may be required in attachment of cartridge 60. Alternatively, the setting information stored in cartridge 60 (memory 63) may be automatically erased by control unit 61 when a predetermined time elapses. Alternatively, output to an apparatus external to cartridge 60 may be prohibited when a predetermined time elapses.

In the configuration of the second embodiment, communication unit 120 of controller 100 corresponds to "first communication unit", output unit 150 corresponds to "information output unit", memory 115 corresponds to "third memory unit", communication unit 125*b* corresponds to "fifth communication unit", and attachment-receiving part 127 corresponds to "second attachment-receiving part". The function of "output control unit" is implemented by control unit 110.

Further, communication unit 41 of the client apparatus (electric apparatus 30) corresponds to "second communication unit", communication unit 43*b* corresponds to "third communication unit", memory 45 corresponds to "first memory unit", and attachment-receiving part 49 corresponds to "first attachment-receiving part". As described above, cartridge 60 corresponds to an embodiment of "input device", and in cartridge 60, communication unit 65 corresponds to "fourth communication unit", and memory 63 corresponds to "second memory unit".

Third Embodiment

In a third embodiment, wireless communication different from wireless home network 20 is used to form an input path of setting information to each client apparatus (electric apparatus 30).

Figure 23:
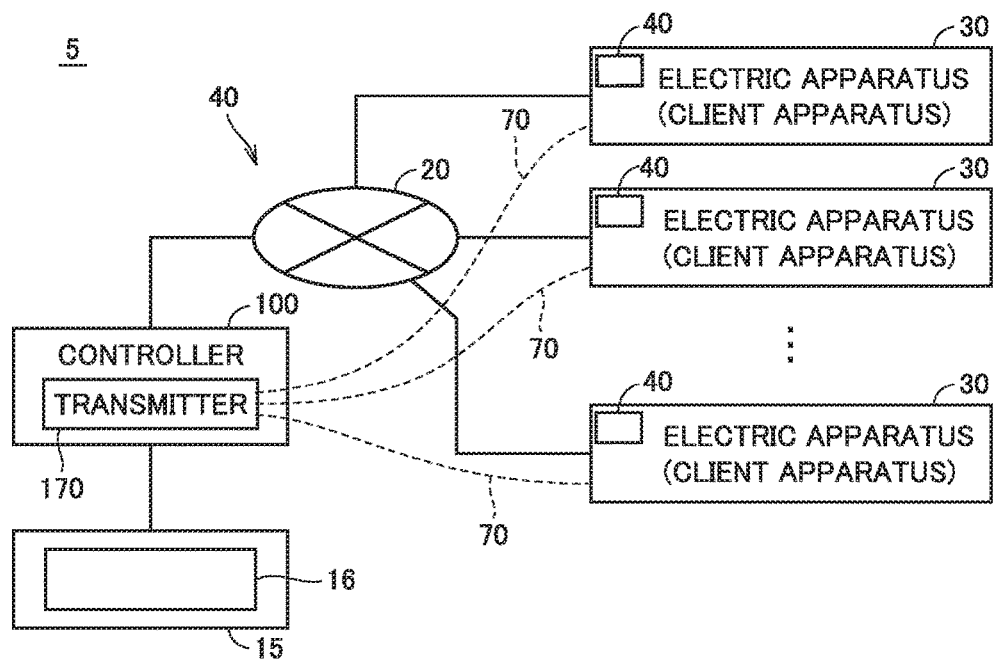
FIG. 23 is a block diagram illustrating an overall configuration of the energy management system which is an application example of the communication system according to a third embodiment of the present invention.

FIG. 23 is a block diagram illustrating an overall configuration of the energy management system to which the communication system according to the third embodiment of the present invention is applied.

FIG. 23 differs from FIG. 1 in that in the communication system according to the third embodiment, an input path 70 of setting information to each client apparatus (electric apparatus 30) is formed by a transmitter 170 contained in controller 100. That is, in the third embodiment, transmitter 170 corresponds to an embodiment of "input device" for writing setting information into each client apparatus (electric apparatus 30). The configuration of the other parts of FIG. 23 is similar as in FIG. 1 and will not be further elaborated.

Figure 24:
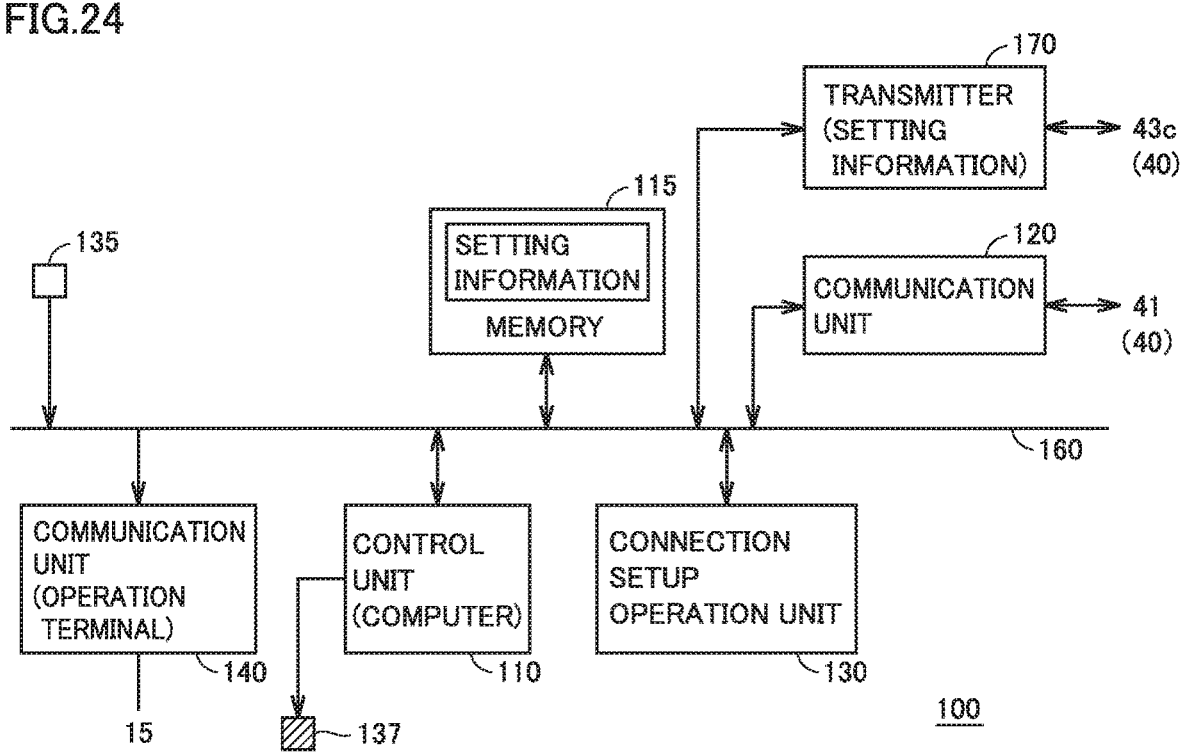
FIG. 24 is a block diagram illustrating a configuration example of the controller in the communication system according to the third embodiment.

FIG. 24 is a block diagram illustrating a configuration example of the controller in the communication system according to the third embodiment.

FIG. 24 differs from FIG. 5 in that controller 100 further includes transmitter 170 for forming input path 70 (FIG. 23), instead of communication unit 125*a*. Transmitter 170 has the function of transmitting a signal to each client apparatus (electric apparatus 30) in a manner of communication different from a manner of communication of wireless communication of wireless home network 20.

When output instruction unit 135 is operated by the user, control unit 110 reads setting information from memory 115 and outputs the setting information using transmitter 170. Thus, in the third embodiment, the arrangement of output unit 150 can be eliminated from the configuration in FIG. 5. The configuration of the other parts of controller 100 in FIG. 24 is similar as in FIG. 5 and will not be further elaborated.

Figure 25:
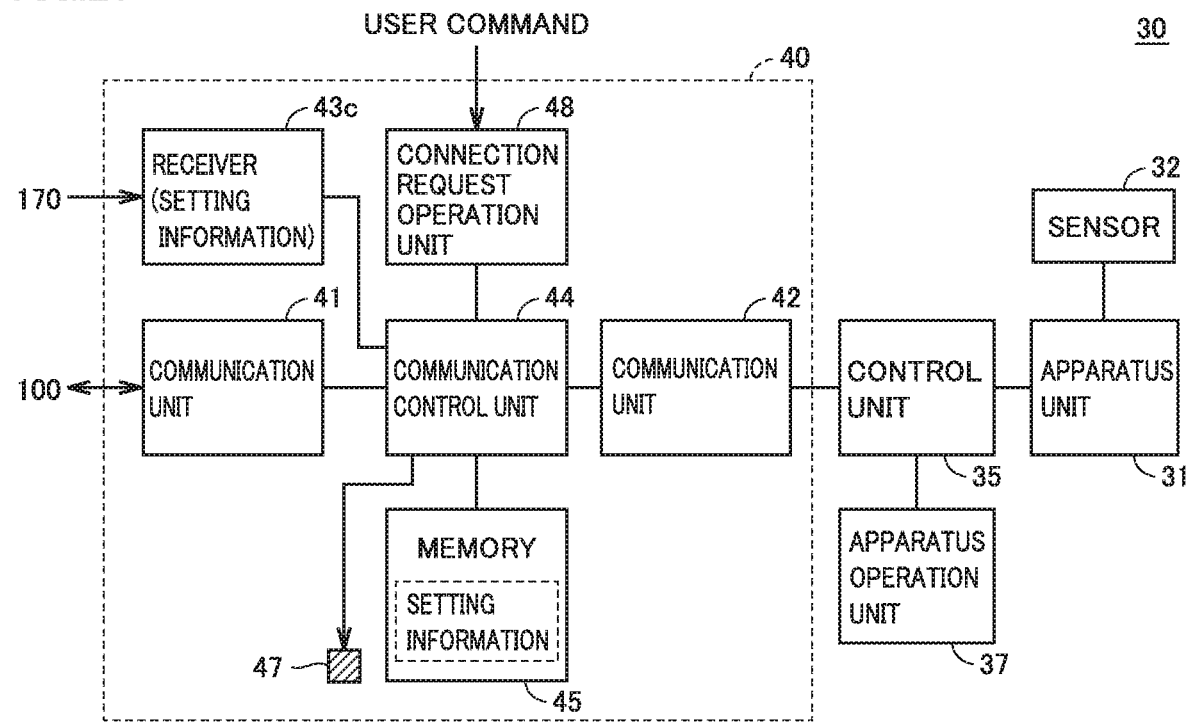
FIG. 25 is a block diagram illustrating a configuration example of the client apparatus (electric apparatus) in the communication system according to the third embodiment.

FIG. 25 is a block diagram illustrating a configuration example of a client apparatus (electric apparatus) in the communication system according to the third embodiment.

FIG. 25 differs from FIG. 7 in that in the third embodiment, communication adaptor 40 of the client apparatus (electric apparatus 30) includes a receiver 43*c* instead of communication unit 43*a*. The configuration of the other parts of communication adaptor 40 in FIG. 25 is similar as in FIG. 5 and will not be further elaborated.

Receiver 43c is configured to have an interface for receiving a signal from transmitter 170 of controller 100. Transmitter 170 and receiver 43c thus form input path 70 of setting information from controller 100 to each client apparatus (electric apparatus 30).

An example of formation of input path 70 will now be described with reference to FIG. 26 and FIG. 27.

Figure 26:
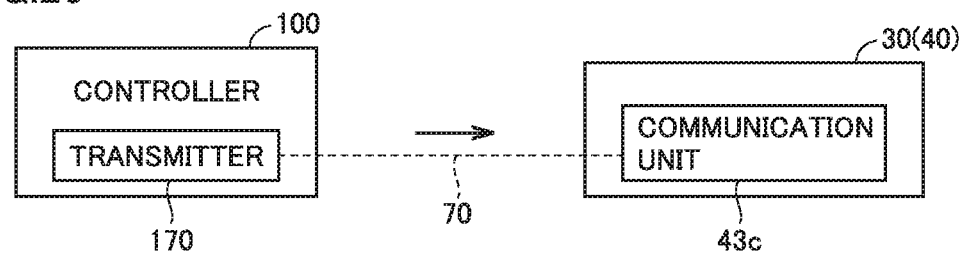
FIG. 26 is a conceptual diagram illustrating a first example of formation of an input path shown in FIG. 23.

FIG. 26 shows input path 70 as a first example in which transmitter 170 (controller 100) is directed to one-to-one communication with a nearby apparatus.

For example, transmitter 170 is configured to communicate with an external apparatus (each client apparatus) via wired communication through a communication cable in accordance with a predetermined communication standard. In this case, each of transmitter 170 and communication unit 43c includes a connector (not shown) fitted to a plug at an end of the communication cable. In this case, input path 70 includes the communication cable.

Alternatively, input path 70 may be formed so as to be directed to one-to-one communication via wireless communication at a relatively short distance and/or with high directivity. For example, input path 70 may be formed with NFC (Near Field Communication) or infrared communication. In this case, each of transmitter 170 and communication unit 43c includes an interface for such communication. According to the first example, setting information is written via wireless communication after a target client apparatus (electric apparatus 30) is specified.

Figure 27:
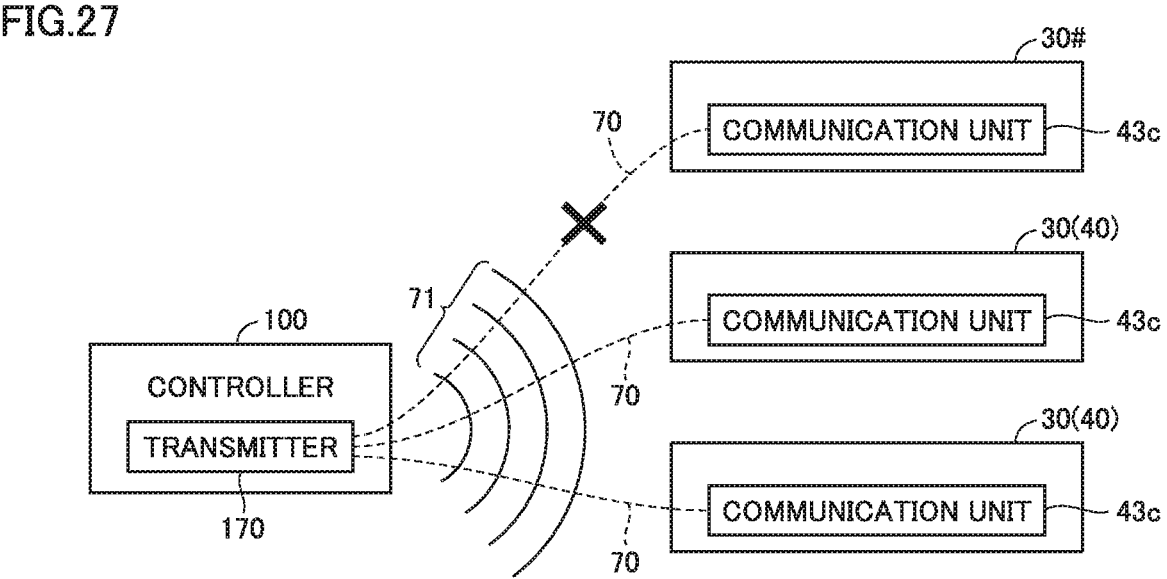
FIG. 27 is a conceptual diagram illustrating a second example of formation of an input path shown in FIG. 23.

FIG. 27 shows input path 70 as a second example in which transmitter 170 is configured to perform wireless communication with low transmission power and/or low frequency, compared with communication unit 120 for wireless home network 20.

Given a communicative distance of general wireless LAN, when setting information is output from controller 100 through wireless communication, for example, a client apparatus (electric apparatus) in the neighboring house may receive the setting information, and then connection setup may be established with the unintended client apparatus.

In FIG. 27, radio waves 71 output from transmitter 170 have a poor ability to pass through wall and the like with lower power and have low linearity with lower frequency, compared with radio waves in wireless communication by communication unit 120. Accordingly, while transmitter 170 can form input path 70 for each client apparatus (electric apparatus 30) in the same house but cannot form input path 70 for a client apparatus (electric apparatus 30#) in the neighboring house.

Therefore, according to the second example, setting information can be written simultaneously into a plurality of client apparatuses (electric apparatus 30) within a certain range, while unintended client apparatuses, for example, in the neighboring house are excluded.

As described above, in the communication system according to the third embodiment, setting information for communicating with controller 100 can be written into each client apparatus (electric apparatus 30) through wireless communication via a path using transmitter 170 contained in controller 100 as "input device".

Accordingly, connection setup to wireless home network 20 can be performed in the same manner as in the first embodiment, without using wireless communication in accordance with a communication protocol common to wireless home network 20. Therefore, the operation load and the operation time of connection setup can be reduced in a wireless communication network to which a plurality of client apparatuses are connected, in the same manner as in the first and second embodiments.

In the configuration of the third embodiment, communication unit 120 of controller 100 corresponds to "first communication unit", output unit 150 corresponds to "information output unit", and memory 115 corresponds to "third memory unit". The function of "output control unit" is implemented by control unit 110.

Further, communication unit 41 of the client apparatus (electric apparatus 30) corresponds to "second communication unit", receiver 43c corresponds to "third communication unit", and memory 45 corresponds to "first memory unit". As described above, transmitter 170 corresponds to an embodiment of "input device".

Fourth Embodiment

In a fourth embodiment, a uniform display example of display unit 137 (controller 100), display unit 47 (client apparatus), display unit 54 (remote controller 50), and display unit 64 (cartridge 60) will be described.

FIG. 28 is a diagram illustrating an LED display example of connection setup in accordance with the fourth embodiment.

Referring to FIG. 28, each of display units 47, 54, 64, 137 includes four LEDs, namely, LED 1 to LED 4.

LED 1 displays whether connection setup is executable (READY state). In each of controller 100, the client apparatus (electric apparatus 30), remote controller 50, and cartridge 60, LED 1 of each display unit 47, 54, 64, 137 is in ON state (green) in a state in which connection setup is executable. On the other hand, LED 1 is in OFF state in a state in which connection setup is not executable.

LED 2 indicates a communication state. Therefore, in each of controller 100, the client apparatus (electric apparatus 30), remote controller 50, and cartridge 60, when communication with another device is in progress, LED 1 of each display unit 47, 54, 64, 137 is in a flashing state (green). On the other hand, when communication is not in progress, LED 2 is in OFF state.

LED 3 displays a state of connection setup. Therefore, in each of controller 100, the client apparatus (electric apparatus 30), remote controller 50, and cartridge 60, when connection setup is not yet established, LED 3 is in OFF state. Then, during execution of connection setup, LED 3 is in a flashing state (green). When connection setup is established, LED 3 enters ON state (green).

LED 4 indicates an error state. Therefore, in each of controller 100, the client apparatus (electric apparatus 30), remote controller 50, and cartridge 60, when an error occurs, LED 4 of each display unit 47, 54, 64, 137 enters ON state (red). On the other hand, when no error occurs, LED 4 is in OFF state.

In this manner, the operation situation in connection setup can be easily grasped with the uniform LED display, and therefore the load of connection setup can be further reduced.

In the configuration illustrated in the embodiments and modifications thereof, connection setup operation unit 130 and connection request operation unit 48 corresponding to the push switch for the WPS push button method are provided on controller 100 (server side) and electric apparatus 30 (client apparatus). In this manner, the general connection setup shown in FIG. 2 and FIG. 3 and connection setup through the process of writing setting information in accordance with the present embodiment can be selectively performed. However, in controller 100 (server side) and electric apparatus 30 (client apparatus), the arrangement of connection setup operation unit 130 and connection request operation unit 48 may be eliminated to perform connection setup according to the present embodiment.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. A communication system comprising:
   a plurality of client apparatuses; and
   a communication control apparatus configured to form a wireless network with the plurality of client apparatuses,
   the communication control apparatus comprising a first communication unit configured to wirelessly communicate with each of the plurality of client apparatuses,
   each of the plurality of client apparatuses comprising:
      a second communication unit configured to wirelessly communicate with the first communication unit;
      a third communication unit configured to communicate with an apparatus external to the client apparatus in a manner of communication different from a manner of communication of the first and second communication units; and
      a first memory unit configured to store setting information necessary for each of the plurality of client apparatuses to communicate with the communication control apparatus by forming the wireless network,
   the communication system further comprising an input device configured to input the setting information to each of the plurality of client apparatuses through a path different from a communication path between the first and second communication units, by outputting the setting information external to the input device in response to an operation to the input device,
   each of the plurality of client apparatuses further comprising a communication control unit configured to write, into the first memory unit, the setting information received from the input device by the third communication unit, wherein
   the setting information in the input device is prohibited to output to an apparatus external to the input device, when a predetermined time elapses after the setting information is stored into the first memory unit.

2. The communication system according to claim 1, wherein
   the input device is configured with a portable apparatus independent of the plurality of client apparatuses and the communication control apparatus,
   the portable apparatus comprising:
      a second memory unit configured to retain the setting information;
      a first input operation unit configured to receive a user command to output the setting information from the portable apparatus;
      a fourth communication unit configured to communicate with the third communication unit; and
      a control unit configured to output the setting information retained in the second memory unit to an apparatus external to the portable apparatus, using the fourth communication unit, in response to detection of a user command to the first input operation unit, and
   the fourth communication unit communicates with the third communication unit through wired communication or wireless communication with at least one of high directivity and short communication distance, compared with wireless communication using the first and second communication units.

3. The communication system according to claim 2, wherein
   the communication control apparatus further comprises an information output unit configured to output the setting information in a manner visually recognized by a user in response to user operation,
   the portable apparatus further comprises a second input operation unit for the user to input the setting information, and
   the control unit is configured to write the setting information input by the second input operation unit into the second memory unit.

4. The communication system according to claim 2, wherein
   the portable apparatus further comprises a third input operation unit configured to receive a user command to instruct the communication control apparatus to output the setting information,
   the control unit outputs an output request signal for the setting information to outside of the portable apparatus using the fourth communication unit, in response to detection of the user command to the third input operation unit,
   the communication control apparatus further comprises:
      a third memory unit configured to store the setting information;
      a fifth communication unit configured to communicate with the fourth communication unit; and
      an output control unit configured to, when the output request signal is received by the fifth communication unit, read the setting information from the third memory unit and output the read setting information using the fifth communication unit, and
   the control unit is configured to write, into the second memory unit, the setting information received by the fourth communication unit after outputting the output request signal.

5. The communication system according to claim 1, wherein
   the input device is configured with a portable apparatus having an attachment part attachable to at least each of the plurality of client apparatuses,
   the portable apparatus comprises:
      a second memory unit configured to retain the setting information; and
      a fourth communication unit configured to communicate with an apparatus external to the portable apparatus in a manner of communication different from a manner of communication of the first and second communication units,
   each of the plurality of client apparatuses further comprises a first attachment-receiving part to which the attachment part of the portable apparatus is attached,
   the third communication unit is configured to communicate with the fourth communication unit of the portable apparatus attached to the first attachment-receiving part, and the portable apparatus further comprises a control unit configured to output the setting information retained in the second memory unit using the fourth communication unit to one client apparatus connected to the portable apparatus, of the plurality of client apparatuses, using the fourth communication unit, in response to an operation to attach the portable apparatus to the first attachment-receiving part.

6. The communication system according to claim 5, wherein
the communication control apparatus further comprises:
a second attachment-receiving part to which the attachment part of the portable apparatus is attached;
a third memory unit configured to store the setting information;
a fifth communication unit configured to communicate with the fourth communication unit of the portable apparatus attached to the second attachment-receiving part; and
an output control unit configured to, when attachment of the portable apparatus to the second attachment-receiving part is detected, output the setting information retained in the third memory unit to the portable apparatus using the fifth communication unit.

7. The communication system according to claim 5, wherein the setting information is written in the second memory unit in advance before formation of the wireless network.

8. A method of controlling a communication system comprising a plurality of client apparatuses and a communication control apparatus configured to form a wireless network with the plurality of client apparatuses,
the communication control apparatus comprising a first communication unit configured to wirelessly communicate with each of the plurality of client apparatuses,
each of the plurality of client apparatuses comprising:
a second communication unit configured to wirelessly communicate with the first communication unit;
a third communication unit configured to communicate with an apparatus external to the client apparatus in a manner of communication different from a manner of communication of the first and second communication units; and
a memory unit configured to store setting information necessary for each of the plurality of client apparatuses to communicate with the communication control apparatus by forming the wireless network,
the method comprising the steps of:
inputting the setting information to each of the plurality of client apparatuses through a path different from a communication path between the first and second communication units in response to an operation to an input device provided to be separated from the plurality of client apparatuses and the communication control apparatus, or to be built into the communication control apparatus;
writing the setting information received by the third communication unit via the path into the memory unit, in each of the plurality of client apparatuses; and
prohibiting to output the setting information to an apparatus external to the input device, when a predetermined time elapses after the setting information is stored into the memory unit.

9. The method according to claim 8, wherein
the input device is configured with a portable apparatus independent of the plurality of client apparatuses and the communication control apparatus,
the portable apparatus comprising:
a second memory unit configured to retain the setting information;
a first input operation unit configured to receive a user command to output the setting information from the portable apparatus;
a fourth communication unit configured to communicate with the third communication unit; and
a control unit,
the method further comprising the steps of:
outputting, by the control unit, the setting information retained in the second memory unit to an apparatus external to the portable apparatus, using the fourth communication unit, in response to detection of a user command to the first input operation unit, and
communicating between the fourth communication unit and the third communication unit through wired communication or wireless communication with at least one of high directivity and short communication distance, compared with wireless communication using the first and second communication units.

10. The method according to claim 9, wherein
the communication control apparatus further comprises an information output unit configured to output the setting information in a manner visually recognized by a user in response to user operation,
the portable apparatus further comprises a second input operation unit for the user to input the setting information,
the method further comprising the step of:
writing, by the control unit, the setting information input by the second input operation unit into the second memory unit.

11. The method according to claim 9, wherein
the portable apparatus further comprises a third input operation unit configured to receive a user command to instruct the communication control apparatus to output the setting information,
the control unit outputs an output request signal for the setting information to outside of the portable apparatus using the fourth communication unit, in response to detection of the user command to the third input operation unit,
the communication control apparatus further comprises:
a third memory unit configured to store the setting information;
a fifth communication unit configured to communicate with the fourth communication unit;
the method further comprising the steps of, by an output control unit:
when the output request signal is received by the fifth communication unit, reading the setting information from the third memory unit and outputting the read setting information using the fifth communication unit, and
writing, into the second memory unit, the setting information received by the fourth communication unit after outputting the output request signal.

12. The method according to claim 8, wherein
the input device is configured with a portable apparatus having an attachment part attachable to at least each of the plurality of client apparatuses, the portable apparatus comprises:
a second memory unit configured to retain the setting information; and
a fourth communication unit configured to communicate with an apparatus external to the portable apparatus in a manner of communication different from a manner of communication of the first and second communication units, each of the plurality of client apparatuses further comprises a first attachment-receiving part to which the attachment part of the portable apparatus is attached, the third communication unit is configured to communicate with the fourth communication unit of the portable apparatus attached to the first attachment-receiving part, the portable apparatus further comprises a control unit, the method further comprising the step of:
outputting the setting information retained in the second memory unit using the fourth communication unit to one client apparatus connected to the portable apparatus, of the plurality of client apparatuses, using the fourth communication unit, in response to an operation to attach the portable apparatus to the first attachment-receiving part.

13. The method according to claim 12, wherein
the communication control apparatus further comprises:
a second attachment-receiving part to which the attachment part of the portable apparatus is attached;
a third memory unit configured to store the setting information;
a fifth communication unit configured to communicate with the fourth communication unit of the portable apparatus attached to the second attachment-receiving part; and
an output control unit,
the method further comprising the step of:
when attachment of the portable apparatus to the second attachment-receiving part is detected, outputting the setting information retained in the third memory unit to the portable apparatus using the fifth communication unit.

14. The method according to claim 12, wherein the setting information is written in the second memory unit in advance before formation of the wireless network.

* * * * *